US012559938B2

(12) United States Patent
Dulguerov

(10) Patent No.: US 12,559,938 B2
(45) Date of Patent: Feb. 24, 2026

(54) BUILDING SYSTEM INCLUDING CONCRETE FORMWORK USING CONCRETE SHELLS

(71) Applicant: ASCENT PROJECTS INC., Calgary (CA)

(72) Inventor: Emil Ivanov Dulguerov, Calgary (CA)

(73) Assignee: Ascent Projects Inc., Calgary (CA)

( * ) Notice: Subject to any disclaimer, the term of this patent is extended or adjusted under 35 U.S.C. 154(b) by 650 days.

(21) Appl. No.: 17/680,641

(22) Filed: Feb. 25, 2022

(65) Prior Publication Data

US 2022/0290429 A1 Sep. 15, 2022

Related U.S. Application Data

(60) Provisional application No. 63/160,147, filed on Mar. 12, 2021.

(51) Int. Cl.
*E04B 2/86* (2006.01)
*B28B 7/24* (2006.01)
*B28B 23/02* (2006.01)

(52) U.S. Cl.
CPC ................ *E04B 2/86* (2013.01); *B28B 7/243* (2013.01); *B28B 23/022* (2013.01)

(58) Field of Classification Search
CPC ........ E04B 2/86; E04B 2/8641; E04B 2/8635; E04B 2/8617; B28B 7/085; B28B 7/243; B28B 23/022; B28B 23/028
See application file for complete search history.

(56) References Cited

U.S. PATENT DOCUMENTS 2,014,778 A * 9/1935 Pedersen ................... E04B 2/30 52/562
2,088,645 A * 8/1937 Fling .......................... E04B 5/10 52/565
2,316,819 A * 4/1943 Tedrow ................. E04B 2/8641 52/564
4,067,941 A * 1/1978 Gaudelli ................. B28B 7/243 249/129
4,261,150 A * 4/1981 Sartorio .................. B28B 15/00 52/565

(Continued)

FOREIGN PATENT DOCUMENTS

DE 2125958 A1 * 12/1972
DE 2341901 A1 * 3/1975

(Continued)

*Primary Examiner* — Adriana Figueroa
(74) *Attorney, Agent, or Firm* — Ryan W. Dupuis; Kyle R. Satterthwaite; Ade & Company Inc.

(57) ABSTRACT

A wall assembly for a building structure, uses (i) an inner shell cast in a first mold to define a first panel of concrete having a plurality of stiffener members embedded in the concrete so as to be at least partly exposed at the inner side of the panel, and (ii) an outer shell cast in a second mold to define a second panel of concrete having a plurality of stiffener members embedded in the concrete so as to be at least partly exposed at the inner side of the panel. The inner shell and the outer shell are mechanically coupled after casting to define a mold cavity between the inner sides of the panels. Field concrete can be cast into the mold cavity between the inner and outer shells once the wall assembly is mounted on site into position within the building structure.

19 Claims, 16 Drawing Sheets

(56) References Cited

U.S. PATENT DOCUMENTS

| | | | | | |
|---|---|---|---|---|---|
| 4,338,759 | A * | 7/1982 | Swerdlow | E04B 1/165 52/742.14 |
| 4,598,519 | A * | 7/1986 | Reid | E04B 2/8647 249/43 |
| 5,459,970 | A * | 10/1995 | Kim | E04B 1/165 52/424 |
| 5,611,183 | A * | 3/1997 | Kim | E04B 2/8641 52/363 |
| 6,665,992 | B2 * | 12/2003 | Hew | E04B 7/04 52/568 |
| 8,276,340 | B2 * | 10/2012 | Meilleur | E04G 17/002 52/424 |
| 8,555,583 | B2 * | 10/2013 | Ciuperca | E04G 9/05 52/700 |
| 9,664,396 | B2 * | 5/2017 | Berchtold | E04B 2/56 |
| 2004/0025463 | A1 * | 2/2004 | Yauchi | E04B 2/8635 52/426 |
| 2006/0185291 | A1 * | 8/2006 | Mathe | E04B 2/8617 52/426 |
| 2011/0099932 | A1 * | 5/2011 | Saulce | E04C 5/18 52/745.13 |

FOREIGN PATENT DOCUMENTS

| | | | | |
|---|---|---|---|---|
| DE | 102005025037 | A1 * | 12/2005 | B28B 23/005 |
| DE | 202018105793 | U1 * | 12/2018 | B28B 23/005 |
| FR | 1169901 | A * | 3/1959 | |
| FR | 2789417 | A3 * | 8/2000 | B28B 23/028 |
| GB | 1442953 | A * | 7/1976 | E04B 1/164 |
| KR | 20110031583 | A * | 3/2011 | |
| WO | WO-2011138573 | A2 * | 11/2011 | E04B 2/8641 |

* cited by examiner

BUILDING SYSTEM INCLUDING CONCRETE FORMWORK USING CONCRETE SHELLS

This application claims the benefit under 35 U.S.C. 119(e) of U.S. provisional application Ser. No. 63/160,147, filed Mar. 12, 2021.

FIELD OF THE INVENTION

The present invention relates to a building system having concrete wall and/or floor forms that receive poured concrete therein in which the concrete forms for the walls include inner and outer shells made of precast concrete that are coupled to define a concrete receiving cavity between the inner and outer shells and the concrete form for the slabs consists of bottom shell made of precast concrete receiving the fresh concrete on top. The system is flexible and could be used as a stand alone or in combination with most of the existing building systems for civil and industrial construction as well as infrastructure construction.

BACKGROUND

Concrete is a common building material for walls and floors and the like in various types of buildings. Commonly, concrete formworks are assembled at the building site to receive poured concrete within the forms to be cured. Due to varying environmental factors at each different building location, it can be difficult to maintain quality and precision in the resulting cured concrete. The assembly and subsequent disassembly of the concrete formwork can also be costly and time consuming. Traditional formwork consists of plywood or metal sheets with suitable reinforcement, both disposable or reusable.

In order to improve the quality of the concrete, various attempts have been made to precast concrete wall and floor slab panels for a building within a manufacturing facility for subsequent assembly at a building site in order to cast the concrete in a more controlled environment. The resulting precast panels are heavy concrete members, which require costly transportation and erection using suitable handling equipment. Furthermore, the precast concrete members have to be joined together by using, primarily, welded connections and, in some cases, bolted connections. These joints should be further protected against the elements, thus increasing cost and construction time. The resulting solid concrete structure includes the inevitable creation of cold bridges, especially in the area of the joints where continuation of the thermal insulation is dubious or impossible.

SUMMARY OF THE INVENTION

According to one aspect of the invention there is provided a method of forming a wall assembly for a building structure, the method comprising:

- forming an inner shell using a first mold to cast a first panel of concrete having a first side at the bottom of the mold, a second side at a top of the mold, and a plurality of stiffener members embedded in the concrete so as to be at least partly exposed at the second side of the panel of concrete;
- forming an outer shell using a second mold to cast a second panel of concrete having a first side at the bottom of the mold, a second side at a top of the mold, and a plurality of stiffener members embedded in the concrete so as to be at least partly exposed at the second side of the panel of concrete;
- subsequent to forming the inner shell and the outer shell, mechanically coupling the inner and outer shells so as to define a mold cavity between the second sides of the inner and outer shell; and
- casting field concrete into the mold cavity between the inner and outer shells.

The inner shell and the outer shell may be mechanically coupled while the inner shell and the outer shell remain supported within the first and second molds respectively by displacing the molds towards one another.

The inner and outer shells may be erected into a vertical orientation subsequent to mechanically coupling the inner and outer shells and before casting concrete into the mold cavity between the inner and outer shells.

A layer of insulation may be provided along the second side of one of the inner shell or the outer shell prior to mechanically coupling the inner and outer shells such that the layer of insulation occupies a portion of the mold cavity.

According to a second aspect of the present invention there is provided a building system for a building structure, the system comprising:

at least one wall assembly comprising:

- (i) an inner shell including (a) a panel of concrete having a first side defining an inner surface of the wall assembly and a second side at an interior of the wall assembly and (b) a plurality of stiffener members embedded in the panel of concrete so as to be at least partly exposed at the second side of the panel of concrete;
- (ii) an outer shell including (a) a panel of concrete having a first side defining an exterior surface of the wall assembly and a second side at an interior of the wall assembly and (b) a plurality of stiffener members embedded in the panel of concrete so as to be at least partly exposed at the second side of the panel of concrete; and
- (iii) a mechanical coupling between the inner and outer shells so as to define a mold cavity between the second sides of the inner and outer shells arranged to receive poured concrete therein.

The present invention provides an integrated building system including plant design and fabrication, field installation and field concrete placement. The precast concrete inner and outer shells provide a dual role of (i) concrete formwork for the field placed concrete, and (ii) becoming an integrated part of the structural members sections in combination with the field poured concrete after curing. The system could be used as a stand alone or in combination with the majority of the building systems in use.

The system according to the present invention resolves many issues with prior systems described above. The precast concrete formwork panels are manufactured in controlled environment with greater precision and include flexibility in their application to meet a great variety of design requirements. The precast forms are much lighter than the traditional precast panels and, therefore, the transportation and installation costs are reduced. The system allows elimination of “cold bridges” when an insulation layer is incorporated into the shells before pouring the concrete core. Electrical and other conduits could be placed at plant and finished at field.

In the plant, the concrete for the shells can be poured in horizontal forms with minimal formwork. The forms may be universal for both slabs and walls. For the latter, one form may be static and the other may rotate along a horizontal axis on top of the static one.

In the field, the connection between various structural members is provided by the field placed concrete in combination with reinforcement incorporated within the precast shells and, additionally, field placed reinforcement wherever required. Thus, the need for welded or bolted connections and further protection against the elements is eliminated.

In one embodiment, the stiffener members of the inner shell comprise elongate metal channels that are parallel and spaced apart from one another across a width of the panel of concrete. More particularly, the stiffener members of the outer shell may comprise elongate metal channels that are parallel and spaced apart from one another across a width of the panel of concrete.

Preferably the stiffener members span a height of the mold cavity of the wall assembly.

The panel of concrete of the outer shell may be wider than the panel of concrete of the inner shell by a lateral distance corresponding to a thickness of the wall assembly such that the mold cavity of the wall assembly is arranged to communicate openly with the mold cavity of an adjacent assembly of identical configuration that is supported perpendicularly to the wall assembly in forming an outside corner of the building structure.

In some embodiments, the inner shell may be arranged to support an end of a floor assembly therein defining a lower boundary of a floor cavity arranged to receive poured concrete forming a floor thereon, while the panel of concrete of the outer shell of the wall assembly is taller than the panel of concrete of the inner shell by a protruding height corresponding to a thickness of the floor such that the mold cavity of the wall assembly is arranged to communicate openly with the floor cavity of the floor assembly.

When the wall assembly is used with the floor assembly, the floor assembly may comprise a bottom shell defining the lower boundary of the floor cavity, the bottom shell including a panel of concrete and a plurality of stiffener members partly embedded in the panel of concrete to protrude upwardly from an upper surface of the panel of concrete. Preferably, the bottom shell of the floor assembly is identical to one of the inner shell or the outer shell of the wall assembly.

In some embodiments, the inner shell and the outer shell are identical to one another.

The mechanical coupling between the inner and outer shells may comprise a plurality of mating profiles arranged to be coupled between the stiffener members of the inner and outer shells by longitudinal sliding connections oriented in a direction of a height of the wall assembly.

In some embodiments, the stiffener members of the inner shell are connected to corresponding ones of the stiffener members of the outer shell by respective truss members spanning a height of the mold cavity of the wall assembly.

Alternatively, the stiffener members of the inner shell and the outer shells each span partway across a thickness of the mold cavity towards respective inner ends of the stiffener members, in which the inner end of each stiffener member of the inner shell being joined in proximity to the inner end of a corresponding one of the stiffener members of the outer shell by one or more connectors defining said mechanical coupling. Each connector may define a mating profile arranged to be coupled between the inner ends of the inner and outer shells by longitudinal sliding connections oriented in a direction of a height of the wall assembly.

The mechanical coupling may comprise a plurality of coupling pins at least partly embedded within a first shell among the inner and outer shells and a plurality of receivers at least partly embedded within a second shell among the inner and outer shells, in which the coupling pins are arranged to mate with the receivers in a manner that retains the coupling pins within receivers when the coupling pins are inserted into the receivers along an axis oriented perpendicularly to the inner and outer shells. The coupling pins may be spaced apart across the first shell in a grid pattern.

The system may further include a layer of insulating material spanning the second side of one of the inner shell or the outer shell within the mold cavity.

According to a further embodiment, the system may further include (i) the stiffener members on a first shell among the inner shell and the outer shell comprising truss members arranged to span at least partway across the mold cavity between the panels of the concrete; (ii) the stiffener members on a second shell among the inner shell and the outer shell comprising channel members arranged to receive respective portions of the truss members therein; and (iii) the mechanical coupling being arranged to retain said portions of the truss members within the channel members such that the inner and outer shell are held at a fixed spacing relative to one another. In this instance, the channel members on the second shell may be arranged to receive the respective portions of the truss members inserted therein in an insertion direction that is perpendicular to the panel of concrete of the second shell.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 3:
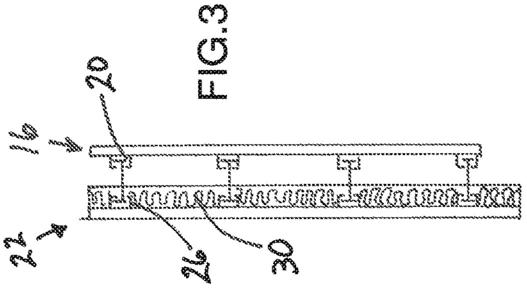
FIG. 3 is a top view of the wall assembly according to the first embodiment of FIG. 1.
Figure 2:
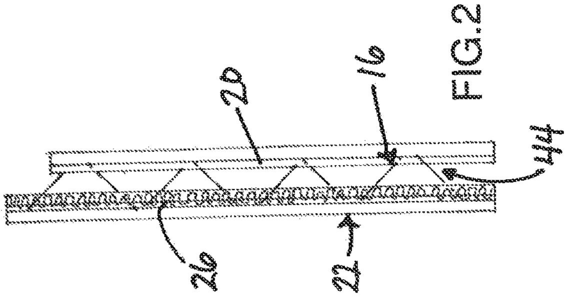
FIG. 2 is an end elevational view of the wall assembly according to the first embodiment of FIG. 1.
Figure 1:
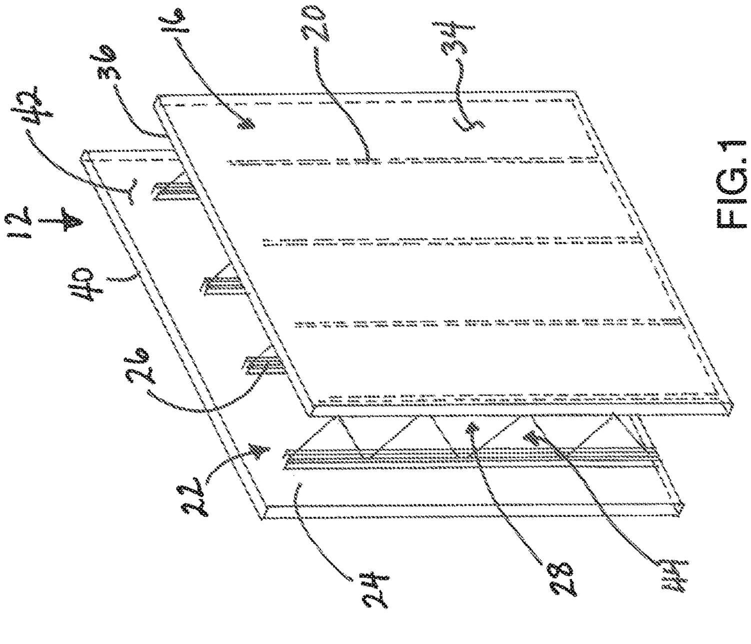
FIG. 1 is a perspective view of a first embodiment of the wall assembly according to the building system of the present invention.

Referring to the accompanying figures there is illustrated a building system generally comprised of a plurality of wall assemblies 12 and optional floor assemblies 14 which are assembled together to form a building structure suitable for receiving occupants and like therein.

Each wall assembly 12 generally comprises (i) an inner shell 16 formed of a concrete panel 18 with stiffener members 20 embedded therein, (ii) an outer shell 22 formed of a concrete panel 24 with stiffener members 26 embedded therein; and various forms of mechanical couplings between the inner shell and the outer shell in a manner that supports the shells in fixed relation to one another and in spaced apart relation to one another so as to define a mold cavity 28 between the shells that is arranged to receive poured concrete therein. The concrete panels 18 and 24 can be cast in respective molds simultaneously with one another at a first manufacturing location and then mechanically coupled to one another subsequent to the concrete being cured by mechanically coupling the panels either at the first manufacturing location or at a second building structure location. Once transported to the second building structure location and erected at the desired location within the building structure, the mold cavity 28 can be filled with poured concrete at the building structure location to complete the construction of the wall assembly.

Optionally an insulating layer 30 formed of rigid panels of insulating material can be mounted alongside one of the concrete panels 18 or 24 at the manufacturing location to occupy a portion of the mold cavity while the remaining portion of the mold cavity remains filled with poured concrete at the building structure location.

The inner shell 16 is molded within a respective first mold 32 by pouring concrete into the mold such that a first side 34 of the concrete panel 18 has a smooth finished texture formed by the bottom side of the mold 32 while the opposing second side 36 of the inner shell is formed at the top side of the mold when the first mold is placed horizontally to receive poured concrete therein. The stiffener members 20 are partially embedded within the concrete panel 18 so as to be parallel and spaced apart from one another while remaining at least partially exposed at the second side of the concrete panel 18. The stiffener members preferably comprise elongate, rigid, metal channels that extend vertically in the assembled wall assembly 12 so as to span substantially the full height of the mold cavity of the wall assembly. A reinforcing grid of rebar or a suitable reinforcing mesh is placed in the mold 32 to be fully embedded within the concrete panel once the concrete panel has been poured. The stiffener members 20 of the inner shell are typically only partially embedded such that the stiffener members protrude from the second side of the inner shell corresponding to the interior of the wall assembly such that the stiffener members 20 extend partway into the mold cavity 28 to respective inner ends of the stiffener members.

Each outer shell 22 is similarly molded within a respective second mold 38 such that a first side 40 of the concrete panel 24 has a smooth finished texture formed by the bottom side of the mold 38 while the opposing second side 42 of the outer shell is formed at the top side of the mold when the second mold is placed horizontally to receive poured concrete therein. The stiffener members 26 are partially embedded within the concrete panel 24 so as to be parallel and spaced apart from one another while remaining at least partially exposed at the second side of the concrete panel 24. The stiffener members 26 preferably comprise elongate, rigid, metal channels that extend vertically in the assembled wall assembly 12 so as to span substantially the full height of the mold cavity of the wall assembly. A reinforcing grid of rebar or suitable reinforcing mesh is placed in the mold 38 to be fully embedded within the concrete panel once the concrete panel has been poured. The stiffener members 26 of the outer shell are typically only partially embedded such that the stiffener members protrude from the second side of the outer shell corresponding to the interior of the wall assembly such that the stiffener members 26 extend partway into the mold cavity 28 to respective inner ends of the stiffener members.

The mechanical coupling between the inner and outer shells may include (i) a plurality of longitudinal couplings 44 which are each connected between a respective one of the stiffener members 20 of the inner shell and a respective one of the stiffener members 26 of the outer shell, and/or (ii) a plurality of individual couplings 46 including a pin 48 partly embedded within and anchored within a first shell among the inner and outer shells and a receiver 50 partly embedded within and anchored within a second shell among the inner and outer shells.

Each longitudinal coupling defines a mating profile forming a connection with the respective pair of stiffener members 20 and 26 in which the profile of the longitudinal coupling 44 mates with both stiffener members for relative sliding in the longitudinal direction therebetween. Each longitudinal coupling 44 thus forms a connection between the concrete panels of the inner and outer shells along the full height of the mold cavity.

Alternatively, the individual couplings 46 provide a connection between the inner and outer shells at individual mounting locations in which the mounting locations of the individual couplings 46 are spaced apart from one another in a grid pattern and/or in proximity to the four corners of a rectangular shaped wall assembly. The pin 48 of each individual coupling 46 includes a first catch 52 formed thereon while the receiver 50 defines a corresponding second catch 54 thereon in which the first and second catches 52 and 54 lie parallel to the inner and outer shells to be hooked and engaged upon one another and resist displacement of the inner and outer shells apart from one another in a mounted and engaged position of the individual couplings 46.

Turning now to FIGS. 1 through 5, a first embodiment of the longitudinal couplings 44 is illustrated in which the connecting profile is a truss having a first flange 56, a parallel and opposite second flange 58, and a web 60 formed of zigzagging rebar interconnected between the first and second flanges. The rebar of the web 60 lies in a single plane oriented perpendicularly to the first and second flanges at opposing sides of the web such that the web and both flanges extend the full length of the connector or longitudinal coupling 44 in the longitudinal direction corresponding to the full height of the mold cavity. Each of the flanges joins the web to form a T shaped connecting profile.

Both of the stiffener members 20 and 26 in this instance define a mating channel 62 arranged to receive the T shaped connecting profile along one side of the truss for relative longitudinal sliding movement therebetween. The mating channel is formed by two side flanges 64 which are coplanar with one another and which include a longitudinally extending gap therebetween that is suitably sized to receive the web of the truss extending therethrough. The side flanges are spaced inwardly from the second surface of the corresponding concrete panel such that the depth of the mating channel 62 is defined between the side flanges 64 and the surface of the concrete having a suitable thickness to receive the thickness of the corresponding first or second flange of the truss therein. Each side flange 64 is connected to a respective leg of the stiffener member that is embedded within the concrete panel. The leg includes an inner flange at the inner end thereof to provide adequate structural support to retain the leg embedded within the concrete panel. The mating channel 62 of each different remember receives the corresponding profile of the truss longitudinally slidable therein. An additional structure of a transverse pin through cooperating apertures, welding, or use of fastener and the like may be employed to fix the position of the truss relative to the stiffener members once in the mounted position to complete the mechanical coupling between the inner and outer shells.

Turning now to FIGS. 6 through 11, according to a further embodiment of the longitudinal couplings 44, the connecting profile may again comprise a full web member having a first flange 56, a parallel and opposite second flange 58, and a web 60 connected therebetween. The web 60 in this instance differs from the previous embodiment in that the web comprises a single panel or sheet of rigid material spanning between the first and second flanges 56 and 58. Optional apertures 66 may be formed in the web 60 to allow crossflow of poured concrete along the length of the wall assembly across the longitudinal couplings while pouring concrete into the mold cavity of the wall assembly as well as positioning of horizontal re-bar reinforcement if required.

Figure 6:
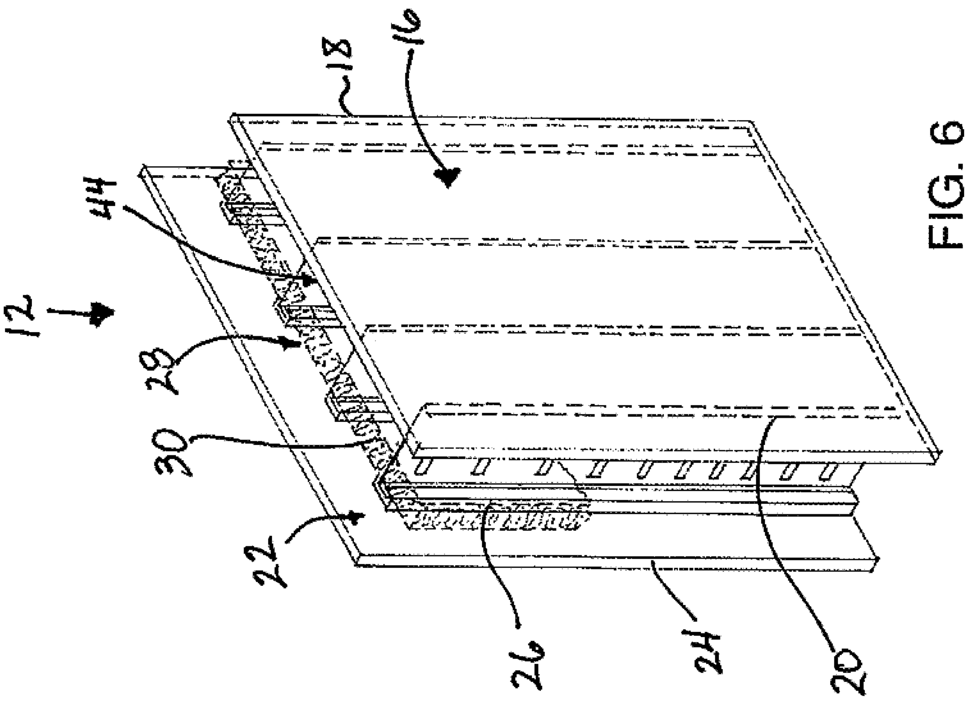
FIG. 6 is a perspective view of a second embodiment of the wall assembly according to the building system of the present invention.
Figure 5:
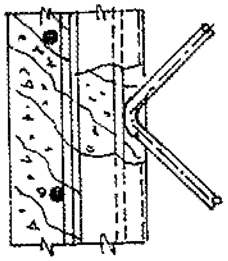
FIG. 5 is a side elevational view of a portion of a truss forming the mechanical connection of the wall assembly according to the first embodiment of FIG. 1.
Figure 4:
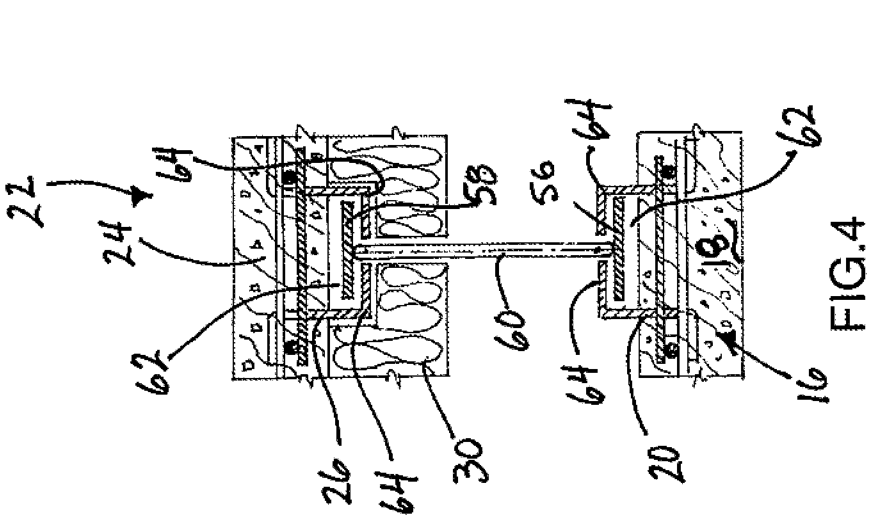
FIG. 4 is an enlarged end view of one of the mechanical connections of the wall assembly according to the first embodiment of FIG. 1.
Figure 9:
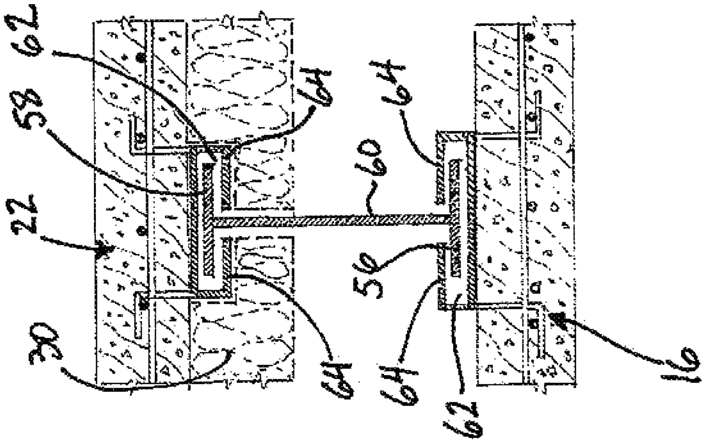
FIG. 9 is an enlarged end view of a first one of the mechanical connections of the wall assembly according to the second embodiment of FIG. 6.
Figure 8:
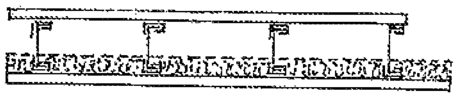
FIG. 8 is a top view of the wall assembly according to the second embodiment of FIG. 6.
Figure 7:
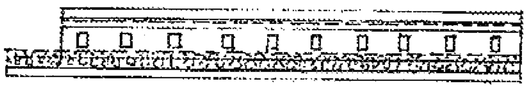
FIG. 7 is an end elevational view of the wall assembly according to the second embodiment of FIG. 6.

Some of the connecting profiles or longitudinal couplings 44 in FIG. 6 include a first flange 56 and a second flange 58 joined to the web 60 to form a T-shaped connecting profile along each edge of the vertical stiffener/connector similarly to the previous embodiment. In this instance each of the stiffener members 20 and 26 is arranged identically to the previous embodiment to define a mating channel 62 formed by two side flanges 64.

Some of the connecting profiles or longitudinal couplings 44 in FIG. 6 however include a first flange projecting laterally from the web in only one direction such that the first and second flanges together with the web have a C shaped profile while each flange 56 and 58 forms a simple L shaped profile for mating with the stiffener members. Each stiffener member in this instance includes only a single side flange 68 at the inner end of the stiffener member. The side flange 68 is supported by a leg of the stiffener member embedded into the concrete panel along one side edge of the side flange while the opposing edge of the side flange is spaced from a second leg embedded in the concrete panel to define a gap between the side flange and the second leg that receives the web of the truss extending therethrough.

In either instance, the inner end of each stiffener member defines a mating channel that mates with a corresponding profile along one edge of the vertical stiffener/connector such that the latter is longitudinally slidable relative to the channel. An additional structure of a transverse pin through cooperating apertures, welding, or use of faster or the like may be employed to fix the position of the truss relative to the stiffener members once in the mounted position to complete the mechanical coupling between the inner and outer shells.

Turning now to FIGS. 12 through 17, according to a further embodiment of the longitudinal coupling 44, in this instance each of the stiffener members extend inwardly partway across the thickness of the mold cavity by a suitable distance such that the inner ends of the opposing stiffener members of each coupled pair are located in close proximity to one another in the mounted position of the wall assembly. The inner end of each stiffener member defines a mounting profile 70 thereon in this instance. The opposing end of each stiffener member includes a base flange 78 anchored within and embedded within the concrete panel. A web portion 76 of the stiffener member spans between the base flange 78 and the profile at the inner end thereof which interlocks with the longitudinal coupling 44. One or more flow apertures 80 may be formed within the web portion to allow crossflow of poured concrete along the length of the mold cavity passed the stiffener members in the mounted position.

The longitudinal coupling 44 in this instance is a connector profile having two mounting channels 72 formed therein in which each mounting channel receives a respective mounting profile 70 of the respective stiffener member therein. Each mounting channel 72 is accessible through a respective channel slot 74 that is open towards the respective shell of the wall assembly to receive a respective portion of the corresponding stiffener member extending therethrough in the mounted position.

Figure 12:
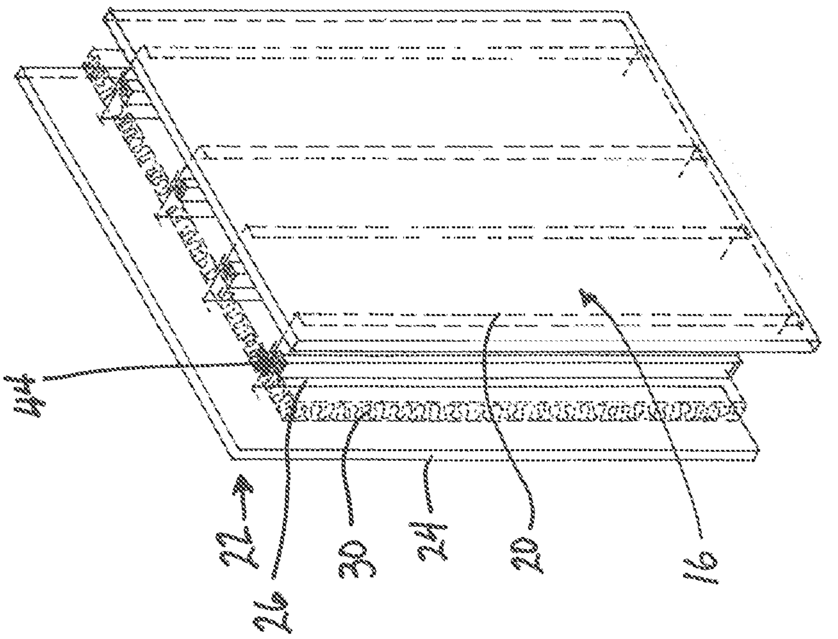
FIG. 12 is a perspective view of a third embodiment of the wall assembly according to the building system of the present invention.
Figure 11:
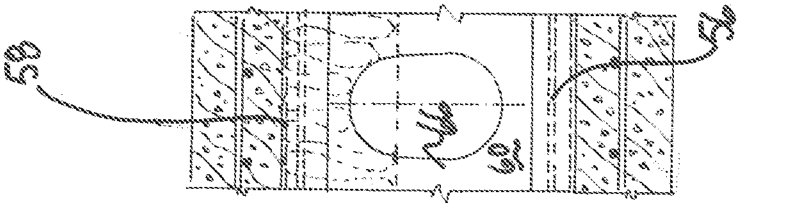
FIG. 11 is a side elevational view of a portion of a full web member, either "C" or "H" section, forming the mechanical connection of the wall assembly according to the second embodiment of FIG. 6.
Figure 10:
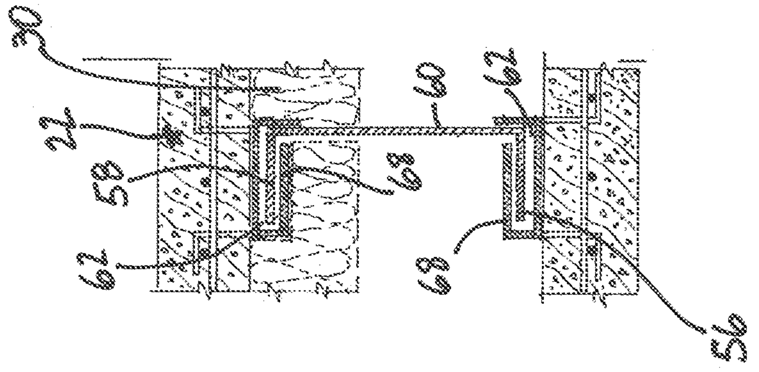
FIG. 10 is an enlarged end view of a second one of the mechanical connections of the wall assembly according to the second embodiment of FIG. 6.
Figure 17:
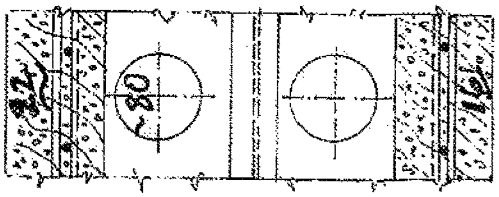
FIG. 17 is a side elevational view of a portion of a truss forming the mechanical connection of the wall assembly according to the third embodiment of FIG. 12.
Figure 16:
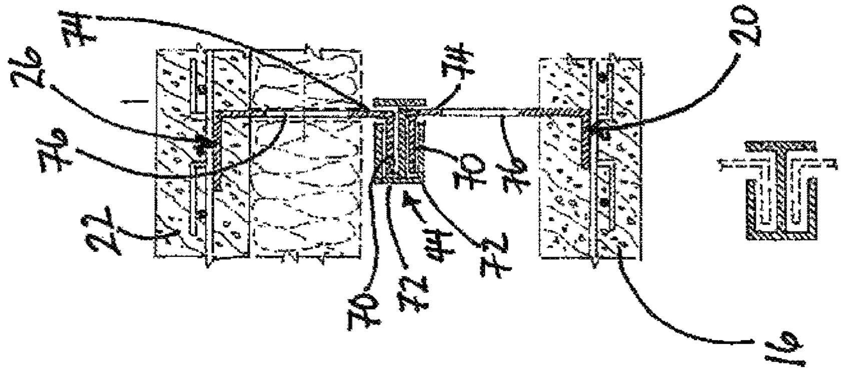
FIG. 16 is an enlarged end view of a second one of the mechanical connections of the wall assembly according to the third embodiment of FIG. 12.
Figure 15:
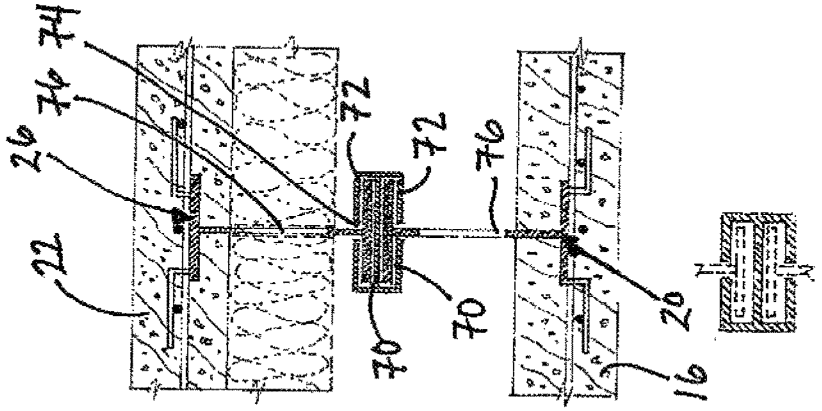
FIG. 15 is an enlarged end view of a first one of the mechanical connections of the wall assembly according to the third embodiment of FIG. 12.
Figure 14:
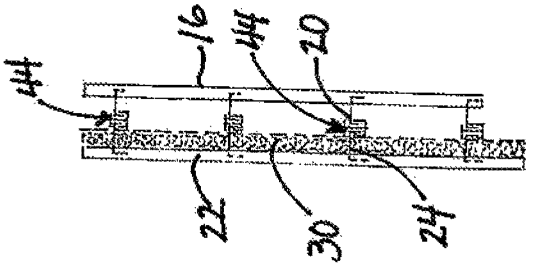
FIG. 14 is a top view of the wall assembly according to the third embodiment of FIG. 12.
Figure 13:
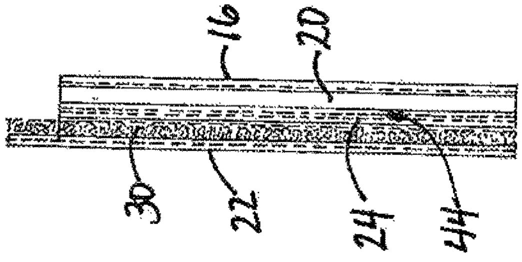
FIG. 13 is an end elevational view of the wall assembly according to the third embodiment of FIG. 12.

As shown in FIG. 12, some of the stiffener members have a mounting profile 70 formed at the inner end thereof by a single flange which is oriented perpendicularly to the web portion 76 of the stiffener member to form a T shaped profile. Each mounting channel in this instance locates the channel slot centrally therein such that the mounting channel and channel slot mate with the T-shaped profile in this instance.

Alternatively, some of the stiffener members have a mounting profile 70 formed at the inner end by a single flange protruding laterally to one side of the web portion 76 to form an L shaped profile. Each mounting channel in this instance locates the channel slot 74 offset to one side of the mounting channel 70 such that the mounting channel and the channel slot mate with the L shaped profile in this instance.

Turning now to FIGS. 24 through 36, various embodiments of the individual mechanical couplings 46 will now be described.

In each instance, the receiver 50 generally includes a base flange 82 arranged to be embedded within the corresponding concrete panel and four latches 84 which are pivotal on the base flange at circumferentially spaced positions about a central socket 86 of the receiver. Each latch is pivotal about an axis that is tangential to the socket. Each latch comprises a leg portion 88 which is pivotal on the base to extend radially outward therefrom in an open position of the receiver, and an end plate 90 supported at the distal end of the leg in perpendicular relation to the radially extending leg in the open position. The latches are pivoted into a closed position by pivoting the legs outward from the concrete panel and radially inwardly towards one another until the legs are oriented substantially axially and the plates 90 lie in a common plane perpendicular to the axial direction of the socket. The end plates 90 each span a respective arcuate section about the circumference of the socket in the closed position while being oriented perpendicular to the socket axis so as to define the catches 54 of the receiver thereon.

In each instance, the connecting pin 48 includes a base 92 embedded within the concrete panel of the respective shell and a shaft portion 94 extending outwardly from the second side of the concrete panel into the mold cavity. A retainer portion 96 along the shaft is increased in diameter relative to the remainder of the shaft to define the catch 52 of the pin thereon. The coupling pin further includes an end portion 98 extending beyond the retainer portion at the end of the pin 48 for being received within the socket 86 within the base 82 of the corresponding receiver. The pin 48 is intended to be inserted axially into the socket so that insertion of the end portion of the pin into the socket 86 drives pivoting movement of the latches 84 from the open position to the closed position thereof. In the closed position the catches 54 on the end plates 90 overlap in a hooking relationship with the corresponding catches 52 on the retainer portion 96 of the coupling pin to thereby restrict subsequent axial removal of the coupling pin 48 from the receiver 50.

Turning now more particularly to the embodiment of FIGS. 24 through 27, in this instance the end portion 98 of the coupling pin 48 includes a plurality of annular ribs 100 at axially spaced positions on the shaft defining a rack of teeth which mesh with corresponding gear teeth 102 provided on the inner end of each leg 88 of the latches. In this instance, as the coupling pin 48 is inserted into the receiver 50, the gear teeth 102 on the latches in the open position mesh with the annular grooves between the ribs 100 on the shaft so that further axial displacement of the coupling pin 48 into the socket of the receiver 50 drives pivoting movement of the latches from the open position to the closed position thereof.

Turning now to the embodiment of FIGS. 28 through 31, in this instance the inner end of each leg 88 is provided with a suitable lobe 104 having a cam profile arranged for sliding interaction with the end portion of the coupling pin inserted into the receiver. The lobes 104 protrude into the path of the socket in the open position such that axial displacement of the coupling pin 48 into the receiver 50 engages the lobes and drives pivoting movement of the legs from the open position to the closed position. The diameter of the end portion 98 of the coupling pin received between the lobes 104 in the closed position functions to prevent the return pivoting of the legs to the open position once the closed position has been reached.

Figure 32:
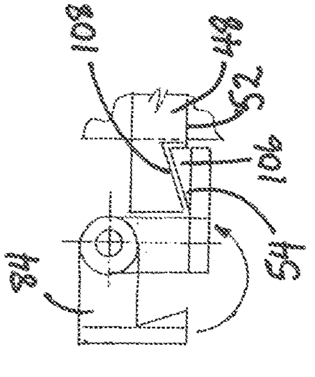
FIGS. 32, 33, and 34 are side elevational view of further embodiments of the receiver and pin of the individual mechanical coupling between the inner and outer shells.
Figure 33:
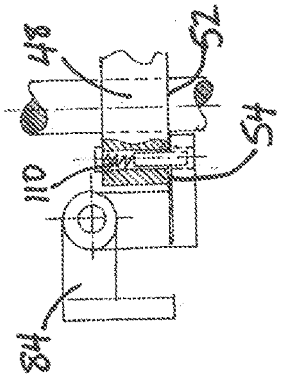
Figure 34:
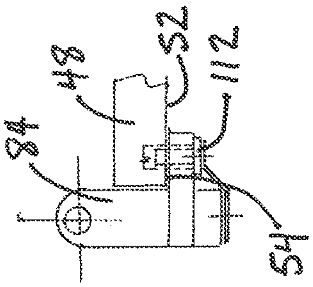

Rather than relying on the interaction of the end portion 98 of the coupling pin 48 with the inner ends of the legs 88 to retain the receiver in the closed position, the catches 54 of the latches 84 may be provided with additional means to be retained upon the corresponding catches 52 on the coupling pin as illustrated in FIGS. 32 through 34.

In FIG. 32 for instance, each catch 54 of the latches 84 may be provided with an axial protrusion extending towards the base of the receiver that fits within a corresponding recess 108 on the mating catch 52 of the coupling pin to provide a hooking function that prevents the radially outward displacement of the legs from the closed position to the open position thereof.

In FIG. 33, each catch 54 of each latch 84 may be provided with an aperture that receives a spring pin 110 therein in the closed position. The spring pin 110 may be mounted within a bore in the catch 52 of the coupling pin to be biased outwardly into engagement within the corresponding aperture in the catch 54 once the spring pin becomes aligned with the corresponding aperture in the closed position of the latches.

In FIG. 34, an additional retainer pin 112 can be inserted through cooperating apertures in the catches 52 and 54 of the coupling pin and receiver pin respectively. The retainer pin 112 provides the same function as the spring pin 110 so as to prevent outward pivoting of the latches 84 from the closed position to the open position thereof.

Figure 35:
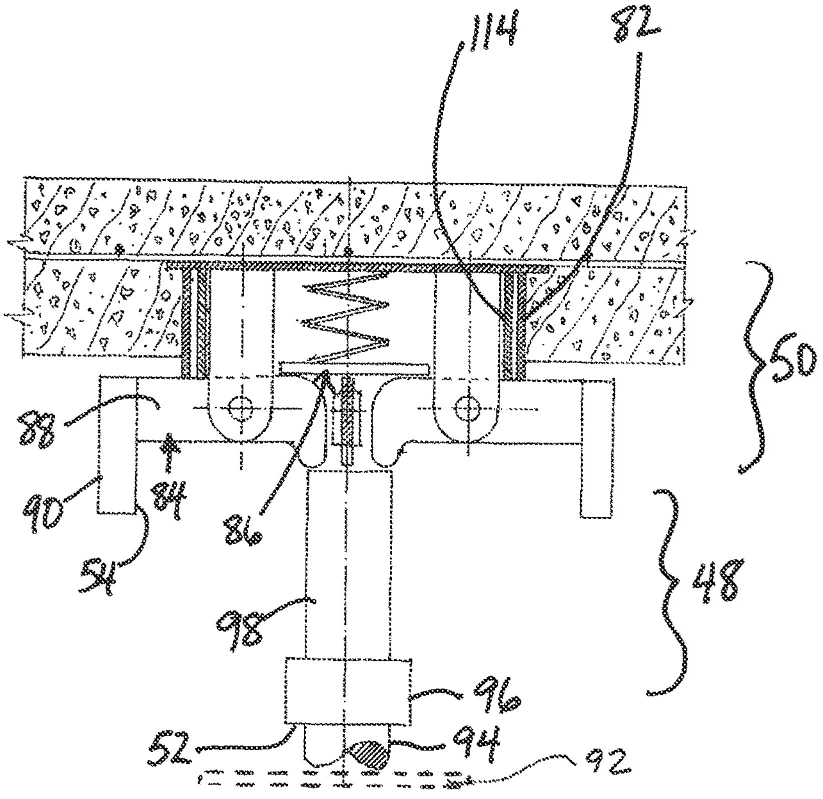
FIG. 35 is an elevational view of an individual mechanical coupling including a pin and mating receiver according to a further embodiment of the receiver in an open position.
Figure 36:
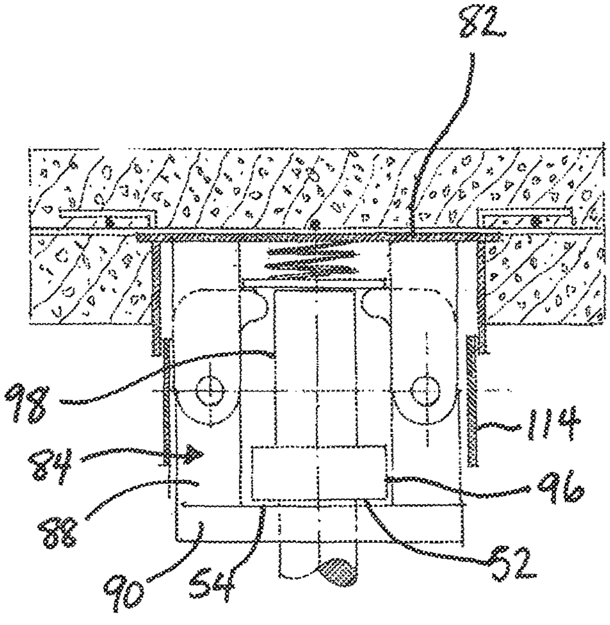
FIG. 36 is an elevational view of the individual mechanical coupling according to the further embodiment of FIG. 35 in a closed position.

As illustrated in FIGS. 35 and 36, any of the embodiments of the individual couplings 46 may be further provided with a retainer collar 114 to couple the latches 84 on the receiver in the closed position. The retainer collar 114 is mounted about the base 82 to be axially slidable. In the open position of the latches, the legs extend radially across the end of the collar to prevent sliding movement of the collar away from the released position of the receiver. Once the legs have been pivoted inwardly towards one another from the open position to the closed position, the legs can be circumscribed by the retainer collar 114 such that the retainer collar is enabled to be axially slidable from a disengaged position adjacent the base 82 to an engaged position surrounding the legs of the latches 84 and thereby preventing radially outward displacement of the legs from the closed position to the open position thereof.

In some instances, the inner shell 16 and the outer shell 22 are substantially identical to one another such that the concrete panels 18 and 24 thereof are identical in dimensions and the arrangement of the stiffener members 22 and 26 are identical such that the inner and outer shells are interchangeable with one another. A wall assembly of this configuration is suitable for installation at an intermediate location along the wall assembly when no additional floor assembly 14 is intended to be supported thereon.

In typical applications, the wall assembly assists in supporting one end of a floor assembly 14 thereon. In this instance, the outer shell 22 includes a panel of concrete 24 which protrudes above the top end of the concrete panel 18 of the inner shell by a protruding height which is approximately equal to the thickness of the floor formed by the floor assembly 14. In this manner, a terminal end of the floor assembly 14 can be supported on the top edge of the concrete panel 18 of the inner shell such that the end of the floor assembly lies substantially flush with the interior second side of the inner shell.

Figure 19:
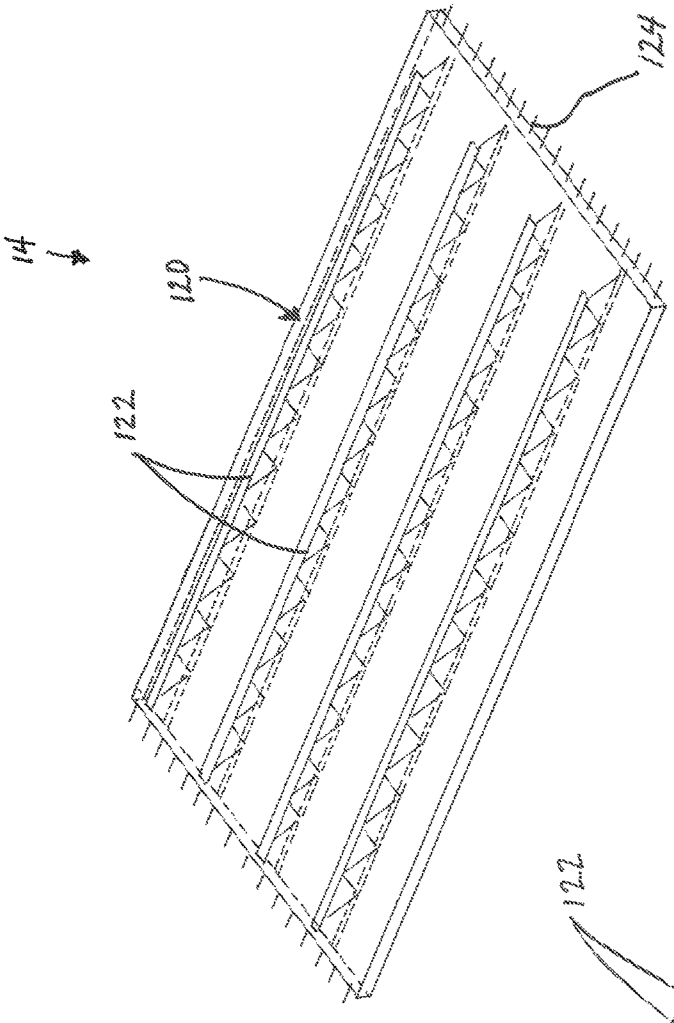
FIG. 19 is a perspective view of the bottom shell for floor slabs according to a second embodiment of the floor assembly shown open web trusses.
Figure 18:
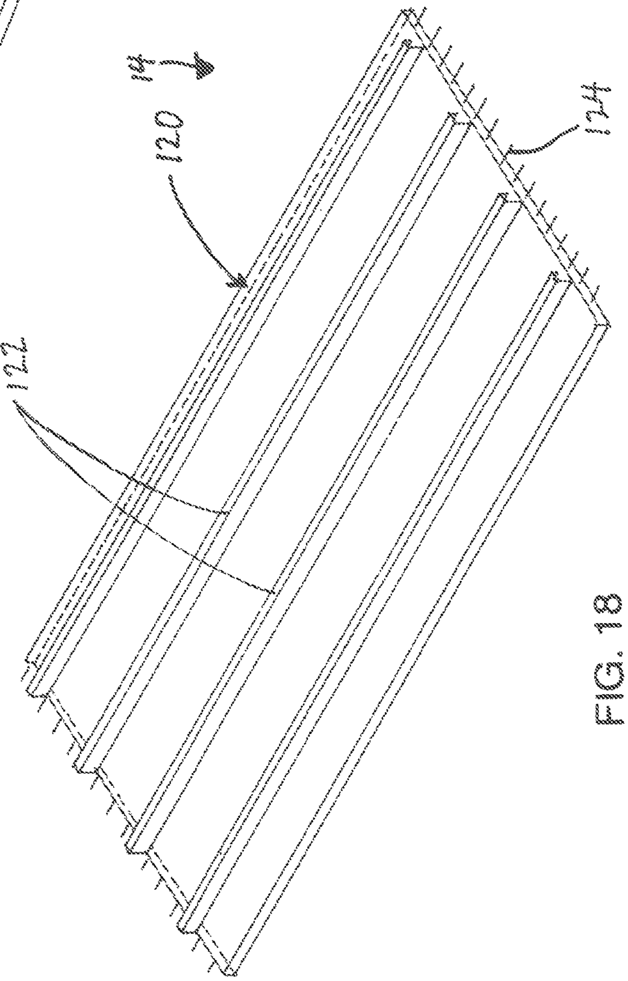
FIG. 18 is a perspective view of the bottom shell for floor slabs according to a first embodiment of the floor assembly showing full web horizontal stiffeners/beams.

Two embodiments of the floor assembly are shown in FIGS. 18 and 19. In each instance the floor assembly includes a bottom shell 120 forming the lower boundary of the resulting floor and a plurality of stiffener members 122 that are partly embedded within the concrete panel. More particularly the concrete panel is a precast concrete member having a bottom side cast within the bottom of a horizontal mold and an opposing top side formed at the top side of the mold. The stiffener members 122 are embedded within the concrete panel to protrude upwardly from the top side of the concrete panel by being cast into the concrete while remaining exposed at the top side. A suitable arrangement of reinforcing members 124 in the form of rebar or a reinforcing mesh is fully embedded within the concrete panel for structural stability of the panel similarly to the shells of the wall assembly. The reinforcing material may protrude from longitudinally opposed ends of the concrete panel for protruding into the mold cavity of a wall assembly supporting the end of the floor assembly thereon.

The concrete panel forming the bottom shell 120 of the floor assembly defines a lower boundary of a floor cavity that is arranged to receive poured concrete forming the resulting floor thereon at the building location. In particular the bottom shell is supported on the ledge at the top of the inner shell of a supporting wall assembly such that the floor cavity of the floor assembly is an open communication with the mold cavity of the wall assembly. Suitable reinforcing members in the form of rebar and the like may be formed in an L shape so that one leg extends horizontally into the floor cavity of the floor assembly and one leg extends vertically into the mold cavity of the wall assembly. Concrete is poured into the mold cavity of the wall assembly and the floor cavity of the floor assembly simultaneously with one another to be cast together as a uniform concrete structure.

Figure 21:
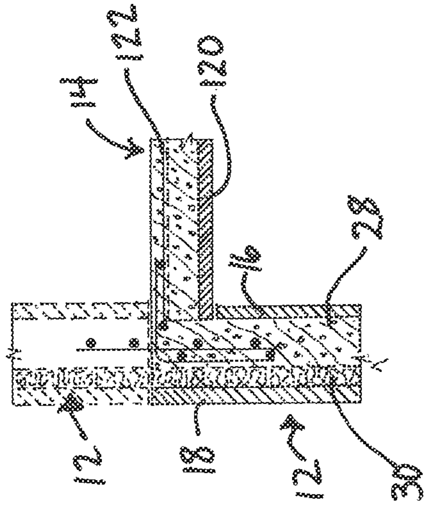
FIG. 21 is an elevational view of the bottom shell of the floor assembly according to the first embodiment of FIG. 19 in a mounted position relative to wall assembly.

By arranging the outer shell 22 to protrude upwardly above the inner shell 16 by a protruding height corresponding to the thickness of the floor assembly, the top end of the outer shell 22 is substantially flush with the topside of the finished floor formed by the floor assembly as shown in FIG. 21. If a second story is provided in the building structure, another row of wall assemblies can be supported above the first row in which the flat bottom of the second row of wall assemblies is supported on the top of the concrete material cast within the floor assembly and the first row wall assembly. In this instance additional reinforcing members may be partially embedded within the concrete cast within the floor assembly and wall assemblies of the first row to protrude upwardly into the intended mounting location of the mold cavity of the wall assemblies of the intended second row above so that the protruding portion of the reinforcing members will be cast into the concrete core of the second row of wall assemblies.

The concrete panel and stiffener members embedded therein forming the bottom shell 120 of the floor assembly may be identical and cast in the same mold used to form either one of the inner shell 16 or outer shell 22 of the wall assembly.

Figure 50:
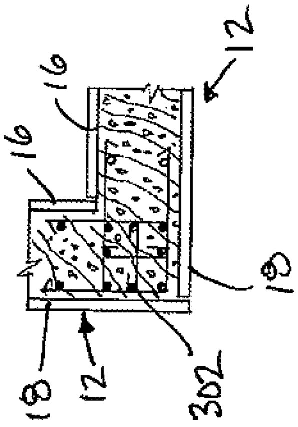
FIGS. 49 and 50 are top views of further embodiments respectively of an outside corner connection between two wall assemblies mounted perpendicularly to one another at an outside corner of a building structure.
Figure 51:
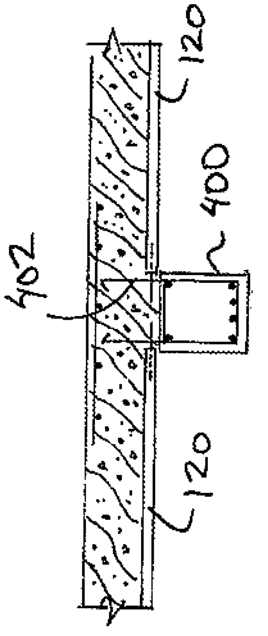

Turning now to FIGS. 50 and 51, when the floor assembly requires additional reinforcement by beams, the beams can be integrally joined to the bottom shells 120 of an adjacent pair of floor assemblies by the poured concrete. In each instance, the bottom shells of two adjacent floor assemblies are spaced apart from one another within a common plane so that a beam structure can be located below the bottom shells with a portion of the beam structure extending upwardly into the mold cavity of the floor assemblies. For example, as shown in FIG. 51, a beam mold 400 having a boundary comprised of a bottom panel and two side panels, can be aligned with the gap between the bottom shells of two adjacent floor assemblies to span the full length of the floor assembly. Each side panel of the mold 400 is abutted in proximity to the corresponding edge of one of the bottom panels so that the cavity within the beam mold 400 openly communicates through the gap with the mold cavities above the bottom shells of the floor assemblies. Reinforcing rebar 402 extends along the cavity of the mold 400 and further extends upwardly into the mold cavity of the floor assemblies at spaced apart locations along the full length of the floor assembly and beam mold. When poured concrete is placed in the mold cavity, the poured concrete surrounds the rebar 402 within the floor assemblies and within the beam mold 400 so that a beam of concrete is integrally molded together with the floor assemblies.

Figure 52:
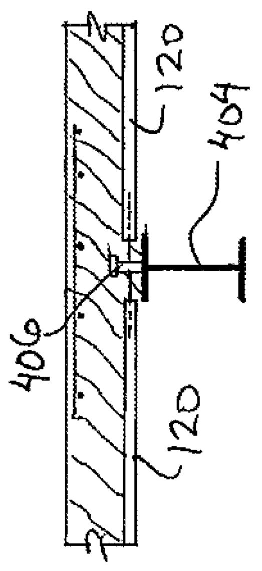
FIGS. 51 and 52 are partly sectional elevational views of further embodiments respectively of the bottom shells of two adjacent floor assemblies which have been reinforced with a beam structure.

Alternatively as shown in FIG. 52, a beam structure may also be provided at the gap between adjacent floor panels in the form of a structural I-beam 404. The beam comprises a bottom flange and a top flange which are parallel and spaced apart and joined with one another by a web similarly to a conventional I-beam. The top flange in this instance is provided with suitable retainer members 406 extending upwardly from the top flange to protrude into the mold cavity. The top flange of the beam fully spans the gap between the bottom shells 120 of the adjacent floor assemblies for enclosing the gap so that the top flange of the I-beam forms part of the lower boundary of the mold cavity of the floor assemblies. When concrete is poured into the mold cavities of the floor assemblies, the poured concrete fully surrounds the retainer members 406 so that once the concrete cures, the I-beam 404 is integrally joined to the floor assemblies by the connection of the retainer members 406 embedded in the concrete.

Turning now to FIG. 18, in this instance the stiffener members 122 define mounting channels protruding above the upper surface of the concrete panel forming the bottom shell 120. The mounting channels are either standalone beam/stiffeners or may have an internal profile suitable for forming a longitudinal sliding connection with a suitable truss member similar to the connection of the trusses to the inner and outer shells of the wall assembly described above. Alternatively, as shown in FIG. 19, a truss member having top and bottom flanges with a web connected therebetween may form each stiffener member 122 on its own by embedding the bottom flange of the truss member into the concrete panel of the bottom shell as the bottom shell is cast in a mold.

At the building structure location, a suitable footing member 126 can be used to support the bottom end of each wall assembly thereon. The footing member 126 is an elongated concrete member, cast in place or precast, extending along the bottom of each wall assembly to enclose the bottom end of the mold cavity of the wall assembly. The footing member 126 is enlarged in thickness relative to the wall assembly. An upper supporting surface of the footing member upon which the bottom end of the wall assembly is supported includes a central groove 128 which is an open communication with the mold cavity above. In this manner the poured concrete into the mold cavity of the wall assembly also fills the central groove and forms a shear key along the bottom of the cured concrete core that retains the lateral position of the wall assembly relative to the footing member once the concrete has been set.

Figure 23:
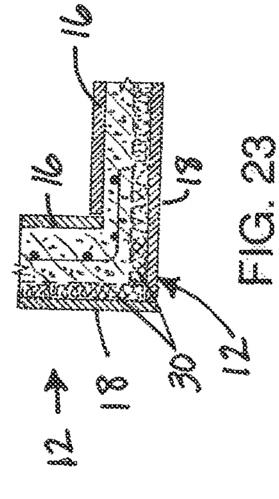
FIG. 23 is a top view of an outside corner connection between two wall assemblies mounted perpendicularly to one another at an outside corner of a building structure.
Figure 27:
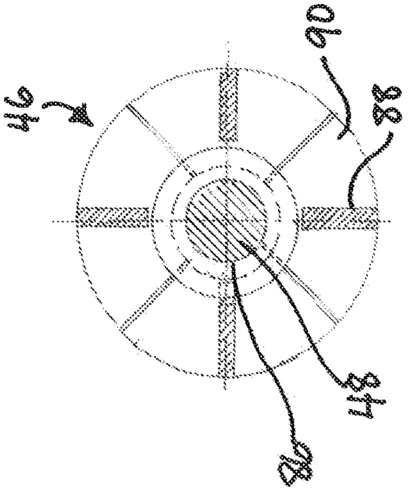
FIG. 27 is a horizontal cross sectional view of the receiver according to the first embodiment of FIG. 24 in the closed position.
Figure 29:
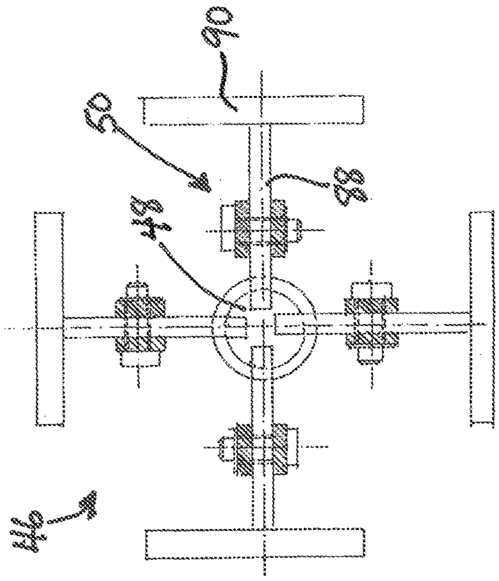
FIG. 29 is a horizontal cross sectional view of the receiver according to the second embodiment of FIG. 28 in an open position.
Figure 26:
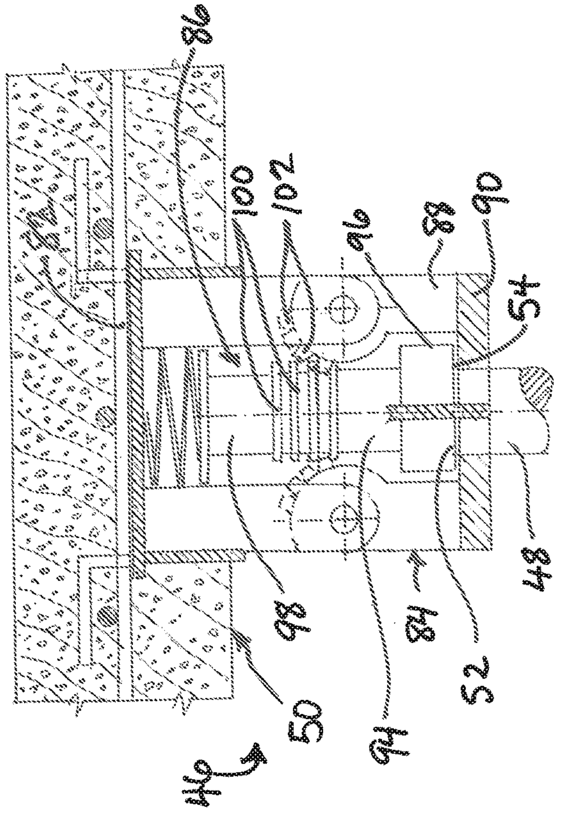
FIG. 26 is an elevational view of the individual mechanical coupling according to the first embodiment of FIG. 24 in a closed position.
Figure 28:
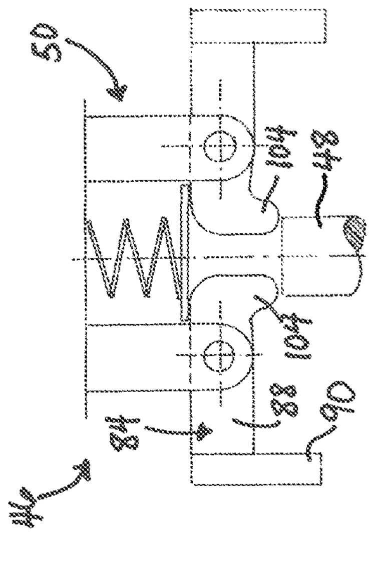
FIG. 28 is an elevational view of an individual mechanical coupling including a pin and mating receiver according to a second embodiment of the receiver in an open position.
Figure 30:
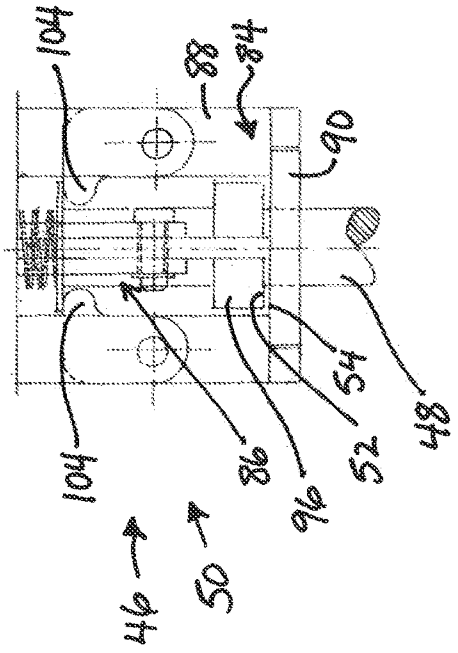
FIG. 30 is an elevational view of the individual mechanical coupling according to the second embodiment of FIG. 28 in a closed position.
Figure 31:
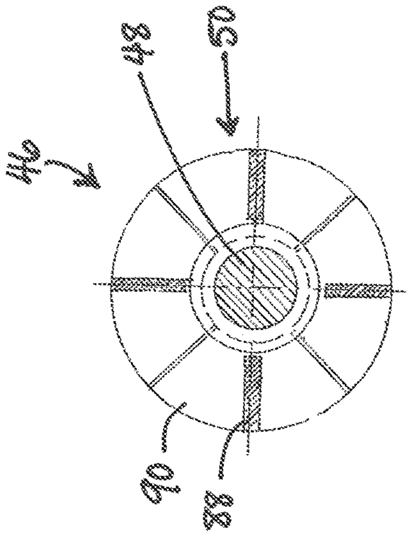
FIG. 31 is a cross sectional view of the receiver according to the second embodiment of FIG. 28 in the closed position.

In some instances, the concrete panel 24 of the outer shell also protrudes laterally outwardly beyond the end of the concrete panel 18 of the inner shell, for example when forming an outside corner in the building structure where two wall assemblies are joined at respective ends thereof in a perpendicular orientation relative to one another as shown in FIG. 23. In this instance the outer shell 22 protrudes laterally outwardly beyond the inner shell by a lateral distance corresponding approximately to the thickness of the perpendicular wall assembly. In this manner, the corresponding ends of the outer shells of the adjacent wall assemblies joined at the corner abut one another at the exterior of the corner and the inner shells similarly abut one another at the interior of the corner while the mold cavities of the adjacent wall assemblies remain in open communication with one another.

In this instance, the adjacent wall assemblies can be filled with poured concrete in the mold cavities thereof simultaneously with one another to form a uniform concrete structure once the concrete has cured. Suitable reinforcing members which are L-shaped can also be mounted at the corners between the adjacent wall assemblies in which one leg of the reinforcing members extends into the mold cavity of a first wall assembly and the other leg extends perpendicularly into the mold cavity of a second wall assembly of the adjacent pair of wall assemblies forming the corner as further shown in FIG. 23.

Figure 49:
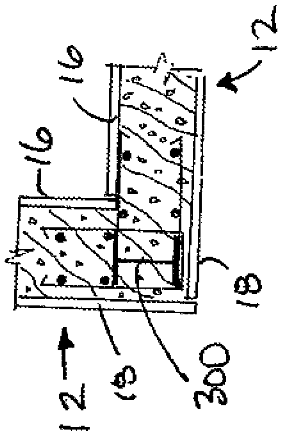

Alternatively, additional reinforcement may be provided at a corner junction between two wall assemblies by locating a reinforcing column member 300 as shown in FIG. 49 in the mold cavity between the shells of the adjacent wall assemblies before pouring concrete into the cavity. The column member 300 in this instance can be connected to reinforcing rebar members that extend partway into the mold cavities of each adjacent wall assembly. The column member 300 is undersized relative to the mold cavity to ensure the beam is fully surrounded by the concrete poured into the mold cavity.

Alternatively, as shown in FIG. 50, a rebar framework 302 may be assembled into a columnar structure that is placed within the mold cavity at the junction of two wall assemblies forming a corner. Again, reinforcing rebar members connected to the rebar framework 302 can extend partway into the mold cavities of each adjacent wall assembly to rigidly interconnect the wall assemblies.

As described above, the inner shell 16 is precast at a manufacturing location within a respective first mold 32 in which the mold includes a bottom side that is horizontally oriented against which the first side 34 of the panel of concrete is molded, while the stiffener members of the inner shell protrude upwardly above the second side of the concrete panel corresponding to the top of the first mold. Likewise, the outer shell 22 is precast at the manufacturing location within a respective second mold 38 in which the mold includes a bottom side that is horizontally oriented against which the first side 40 of the panel concrete is molded while the stiffener members of the outer shell protrude upwardly above the second side of the concrete panel corresponding to the top of the second mold. The inner and outer shells can be simultaneously poured and cured within their respective molds.

Figure 37:
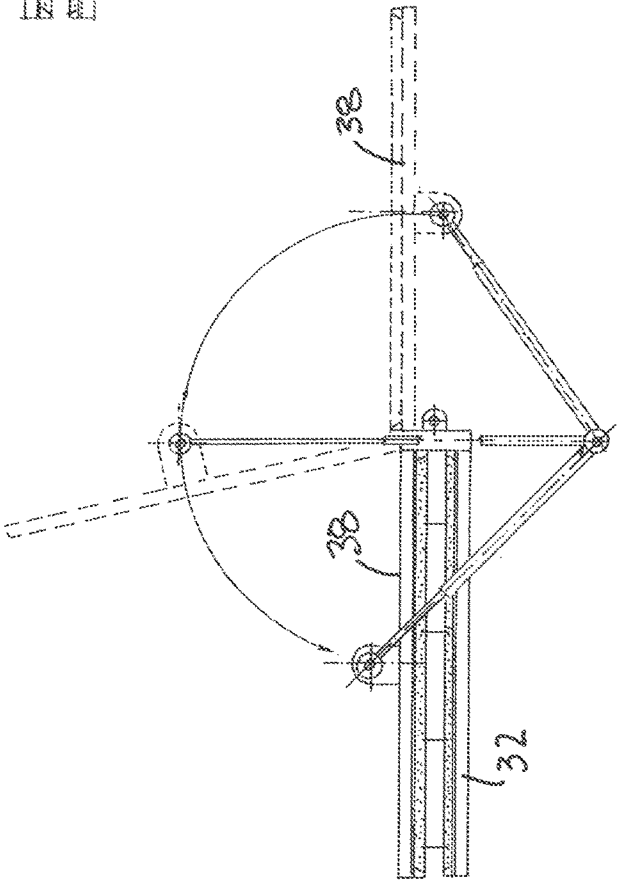
FIG. 37 is an elevational view of two molds for simultaneously molding the inner and outer shells of a wall assembly illustrating displacement of the molds towards one another after the concrete panels have cured to allow subsequently mechanical coupling of the inner and outer shells to one another.

Typically, while the inner and outer shells remain supported within their respective molds, as the molds are pivoted towards one another such that the shells are brought closer to one another into a parallel and spaced apart relationship as shown in FIG. 37. A supporting frame couples the first and second molds to pivot relative to one another from a molding orientation to receive poured concrete to a mounting position allowing mechanical coupling between the inner and outer shells. The supporting frame may support the molds at an adjustable spacing relative to one another to allow mechanical coupling corresponding to various thicknesses of the mold cavity between the shells and the resulting thickness of the wall assembly.

Figure 38:
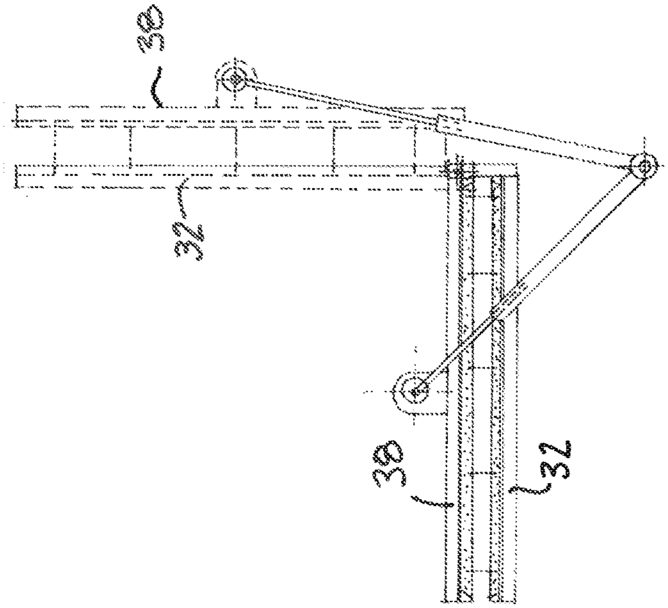
FIG. 38 is an elevational view of the two molds being erected into a vertical orientation for transport once the inner and outer shells have been mechanically coupled to one another.

Once the molds have been brought in proximity to one another, the mechanical coupling between the concrete panels of the inner and outer shells can be accomplished by the insertion of longitudinal couplings 44. Alternatively, or in addition to the longitudinal couplings, the individual couplings 46 may also form a connection between the concrete panels in which displacement of the inner and outer shells towards one another is sufficient to automatically engage the receivers to be displaced from the open position to the closed position thereof, thereby fixing the inner and outer shells immovably relative to one another. Once the mechanical coupling between the inner and outer shells has been performed, and the shells are immovable relative to one another, the molds can be displaced to a vertical orientation as shown in FIG. 38 to enable the wall assembly to be supported in a vertically suspended manner while the first and second molds are released from the cast inner and outer shells and returned to the horizontal orientation for casting of a subsequent set of shells therein.

In further embodiments, the shells can be individually displaced into a vertical orientation by reorientation of the molds followed by releasing of the panels from the molds for transport to a building structure location. The inner and outer shells can then be mechanically coupled to one another at the appropriate spacing defining a mold cavity therebetween at the manufacturing location, or alternatively once the inner and outer shells have arrived at the building structure location.

When an insulating layer 30 is provided, the insulation is typically in the form of rigid foam panels of heat insulating material which can be cut in longitudinal strips to be received between adjacent pairs of parallel and spaced apart stiffener members so that each strip of insulating material spans a full height of the mold cavity and a full width between two stiffener members. The insulating material has a thickness that spans less than half of the thickness of the mold cavity formed by the wall assembly and thus only occupies a small portion of the mold cavity. The insulating layer can be installed along the second side of the outer shell within the interior of the mold cavity according to the illustrated embodiment. The insulating layer 30 can be supported on the outer shell prior to mechanical coupling of the outer shell to the inner shell for optimal access to the interior side of the outer shell where the insulation is placed.

Typically, a sufficient number of wall assemblies are pre-formed at a manufacturing location and transported to the building structure location so as to extend about a full perimeter of the desired building structure and form a continuous perimeter wall about the building structure, optionally with one or more intermediate wall structures within the interior of the building structure as well. Poured concrete can be used to fill the continuous mold cavity formed about the full perimeter of the building structure by the end-to-end abutment of wall assemblies about the perimeter of the building structure. The poured concrete cures in connection with the inner and outer shells of the wall assemblies to form a single unitary structure of a perimeter wall about the building structure. If using floor assemblies spanning across a first level of wall assemblies, the floor cavity of the floor assemblies can be filled with concrete simultaneously with the wall assemblies upon which the floor assemblies are supported. Each subsequent row of wall assemblies extends about the perimeter of the building for each subsequent level of the building with a corresponding set of floor assemblies similarly supported upon the wall assemblies of the subsequent level.

Figure 40:
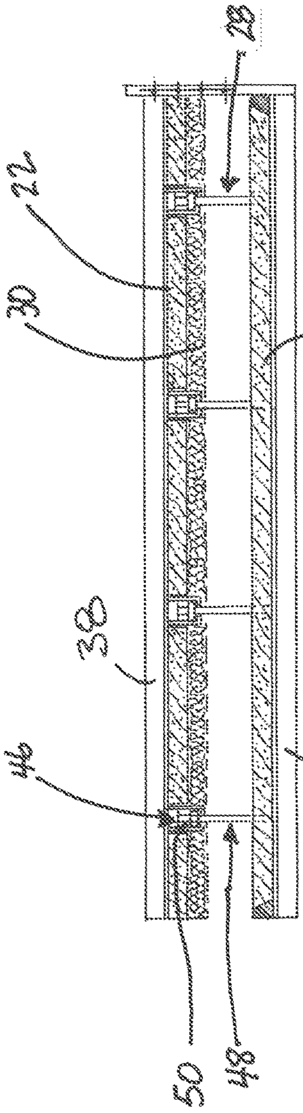
FIGS. 39 and 40 illustrate the molds for the inner and outer shells being displaced towards one another such that the pins and receivers of the individual mechanical couplings are displaced from respective open and disengaged positions to respective closed and engaged positions.
Figure 39:
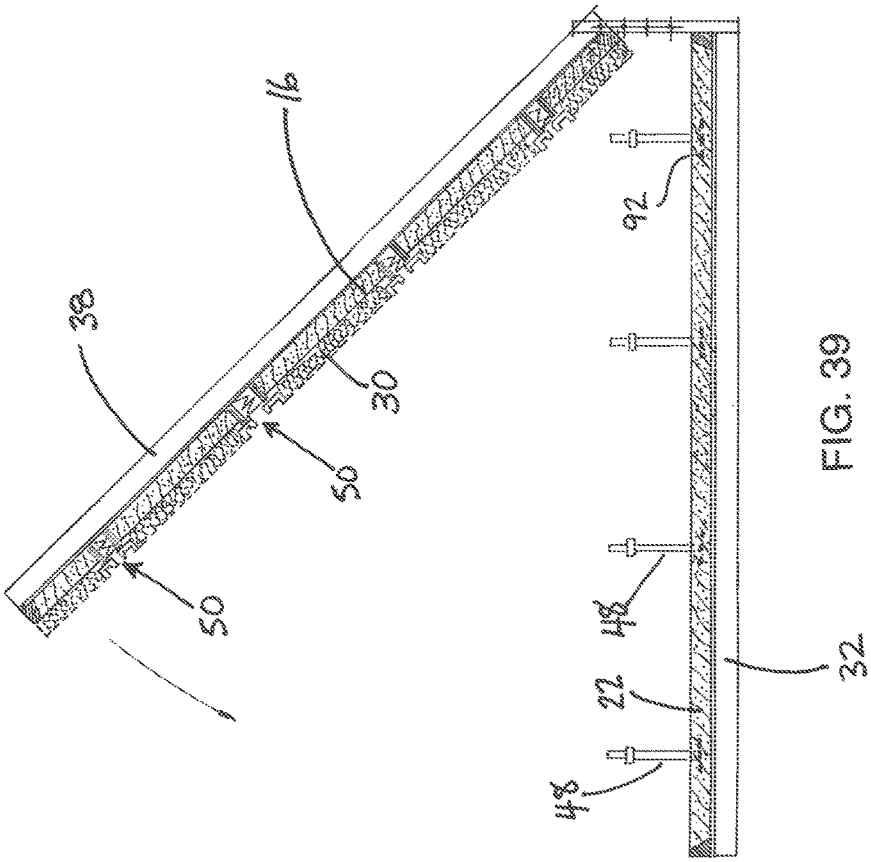
Figure 42:
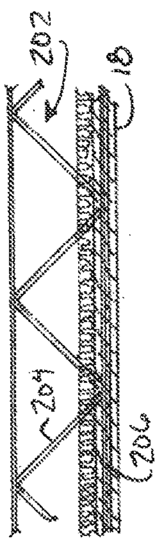
FIG. 42 is a sectional view along the line 42-42 in FIG. 41.
Figure 41:
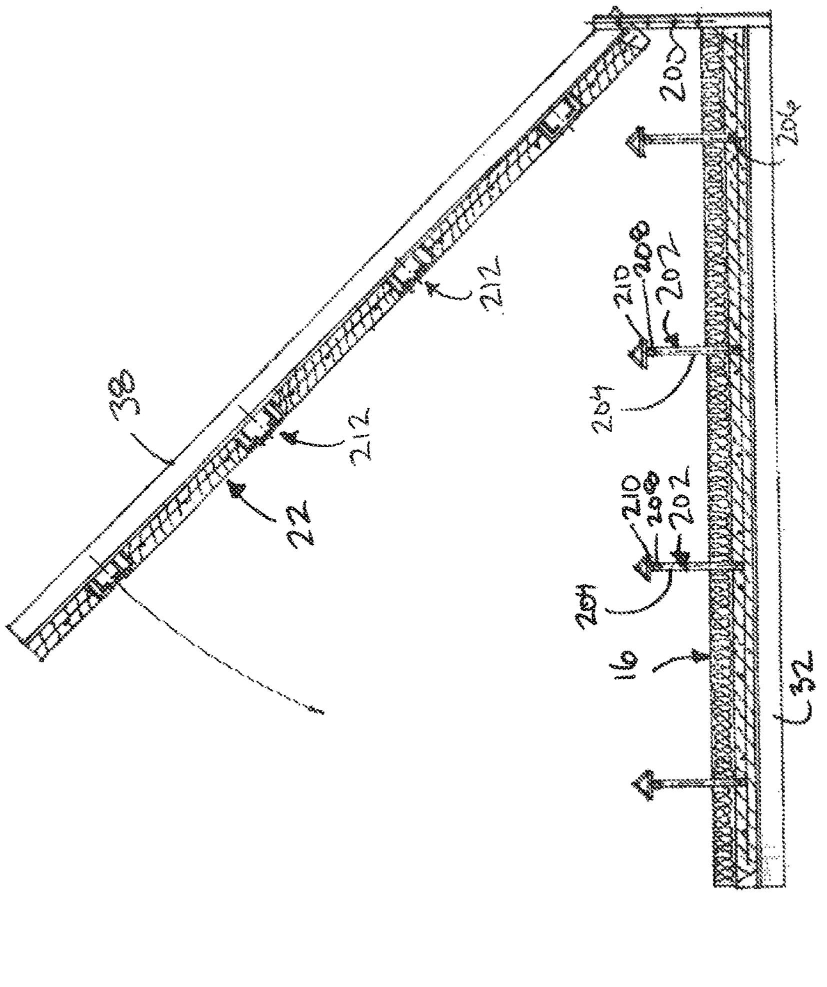
FIG. 41 is a partly sectional end view of a further embodiment of the wall assembly according to the building system of the present invention in which the inner and outer shells are shown formed within respective molds being pivoted towards one another after casting to mechanically couple the inner and outer shells.

In the illustrated embodiment of FIGS. 39 and 40, a grid of individual mechanical couplings 46 may be used to form the connection between the inner shell and the outer shell of each wall assembly without the use of any longitudinal couplings 44. In this instance, the inner and outer shells continue to have stiffener members partly embedded therein which protrude into the mold cavity such that the subsequent casting of poured concrete into the mold cavity at the building structure location causes the core concrete within the mold cavity to partly surround the portions of the stiffener members protruding into the mold cavity to ensure the core concrete within the mold cavity forms a unitary structure with the concrete of the inner and outer shells.

Figure 43:
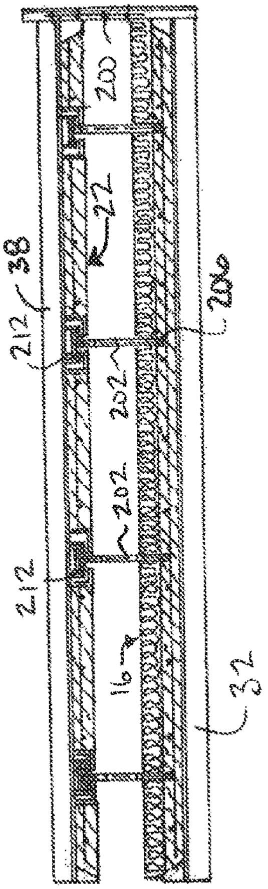
FIG. 43 is a partly section end view of the wall assembly according to the embodiment of FIG. 41 after the inner and outer shells have been mechanically coupled.

According to further embodiments shown in FIG. 41 through 48, the shells of the wall assembly are again formed in molds including a first mold 32 and a second mold 38 similarly to the molds as shown and described with regard to FIGS. 37 through 40. In this instance a first mold 32 is used for casting the concrete panel 24 of a first shell which in this instance corresponds to the inner shell 16 while a second mold 38 is used for casting the concrete panel of the second shall which in this instance corresponds to the outer shell 22. A suitable frame 200 is again provided for pivotally coupling the first mold 32 and the second mold 38 relative to one another so that the molds can be pivoted relative to one another from a casting orientation in which the outer sides of the shells are both situated at respective bottom sides of the molds to the coupling orientation in which the molds are brought towards one another for mechanically coupling the first and second shells to one another as shown in FIG. 43 for example. Again, like previous embodiments, each shell 16 and 22 again includes a concrete panel 18 or 24 with embedded stiffener members 20 or 26 embedded within the concrete of the respective panels.

According to the embodiments of FIGS. 41 through 48, the stiffener members of the first shell 16 each comprise a truss member 202 having a web 204 arrange to span the thickness of the mold cavity between the concrete panels of the inner and outer shells. The web spans across the mold cavity between a first end 206 of the web embedded within the concrete panel 18 of the first shell and a second end 208 of the web arranged to be coupled to the corresponding stiffener member of the second shell. The second end 208 of the web of each truss member includes an outer flange 210 mounted thereon perpendicularly to the web. In the illustrated embodiment the web comprises a zigzagging or sinuous pattern of rebar.

The second shell 22 in this instance is provided with stiffener members 26 which comprise channel members 212 arranged to receive the outer flanges 210 at the second end 208 of respective truss members inserted therein in a mounted position of the first and second shells coupled to one another. More particularly, each channel member 212 comprises an inner flange 214 forming the bottom or inner wall of the hollow channel, two side flanges 216 extending perpendicularly outward from opposing sides of the inner flange, and two outer flanges 218 supported on the two side flanges 216 respectively such that the outer flanges 218 lie parallel and spaced from the inner flange 214 while extending inwardly towards one another to terminate at inner ends which are spaced apart by an opening 220 forming a mouth of the channel. The opening 220 between the outer flanges 218 is suitably sized to receive the flange 210 of a corresponding truss member 202 inserted therein when the truss member is inserted in an insertion direction into the channel in which the insertion direction is perpendicular to the plane of the concrete panels of the shell. Each channel member 212 further includes legs 222 protruding from the inner flange 214 to be embedded within the concrete of the corresponding panel to assist in retaining the channel member 212 retained within the concrete panel.

A mechanical coupling is provided to retain each truss member 202 of the first shell 16 retained within a corresponding channel member 212 or mounting channel within the second shell 22. In the illustrated embodiments, mechanical coupling is provided by two locking members 224 received within each channel member 212. The two locking members are provided at opposing sides of the opening 220 of the channel and are displaced away from one another into an open position of the locking members in which the opening 220 is substantially unobstructed by the locking members to readily permit insertion of the flange of the corresponding truss member 202 therein. The locking members 224 can be displaced inwardly towards one another from the open position to the closed position in which retainer flanges 226 on the two locking members 224 respectively protrude inwardly into the opening 220 from opposing sides of the opening to define catches which retain opposing side edges of the corresponding flange 210 thereon to retain the flange within the channel member 212. Each locking member 224 further includes a body portion 228 spanning the full depth of the channel between the inner flange and the corresponding outer flange 218 while having a width which is less than the width of the corresponding outer flange 218 of the channel member such that in the open position of the locking member, the body portion 228 of the locking member and the locking flange 226 that protrude inwardly from the body portion, can both be received beneath the outer flange 218 without obstructing the opening 220.

Figure 44:
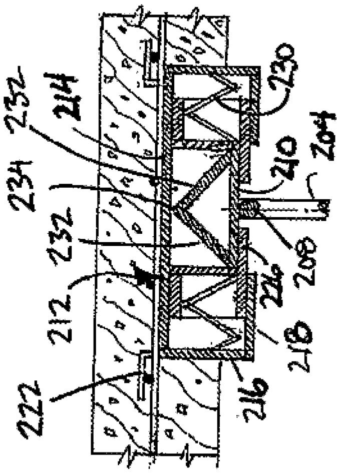
FIG. 44 is a sectional end view of one of the channel members receiving the flange of one of the truss members in a closed and locked position of the locking members of the system according to the embodiment of FIG. 41.
Figure 45:
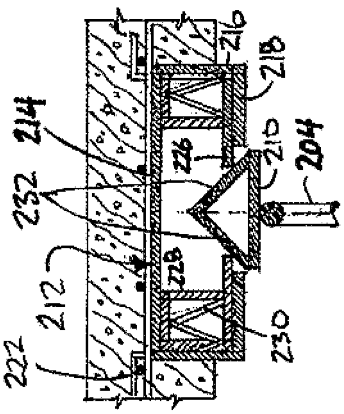
FIG. 45 is a sectional end view of the locking members of FIG. 44 shown in the open or unlocked position prior to receiving the flange of one of the truss members therein.

As shown in the embodiment of FIGS. 44 and 45, a pair of springs 230 may be operatively mounted between the body portion 228 of each locking member 224 and the corresponding side flange 216 of the channel member 212 to bias the locking members inwardly from the open position to the closed position thereof. The springs cooperate with guide flanges 232 mounted on the flange 210 of the truss member 202 to allow the locking members 224 to be automatically opened during insertion of the truss member into the channel member and then closed upon reaching the fully inserted position to retain the flange of the truss member fully inserted within the channel member in a locked position.

The guide flanges 232 are mounted to extend from opposing side edges of the flange 210 away from the web of the truss member while being sloped inwardly towards one another to be joined at a respective apex 234 centrally located between the side edges of the flange 210. As the truss member is displaced into the channel member in the insertion direction, the sloped surfaces of the guide flanges 232 engage the inner edges of the retainer flanges 226 of the locking members to urge the locking members away from one another into the open position. Upon the guide flanges abutting the inner flange 214 of the channel member 212, the flange 210 of the truss member 202 reaches a fully inserted position into the channel member so that the retainer flanges can be displaced inwardly into the closed position below corresponding surfaces of the flange 210 to retain the flange within the channel member. The guide flanges also function as a spacer by spanning the full depth of the channel member 212 between the retainer flanges 226 of the locking members and the inner flange 214 of the channel member so that upon reaching the locked position of the locking members, the truss member 202 is fixed in the insertion direction relative to the channel member. In this instance the first and second shells are in turn supported at a fixed spacing relative to one another by the mechanical coupling of the flanges 210 of the truss members 202 received within the channel members 212.

Figure 46:
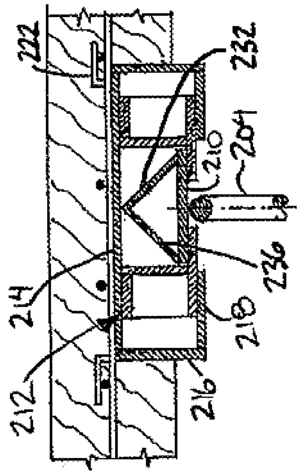
FIG. 46 is a sectional end view of one of the channel members receiving the flange of one of the truss members in the closed and locked position according to a further embodiment of the locking members.
Figure 47:
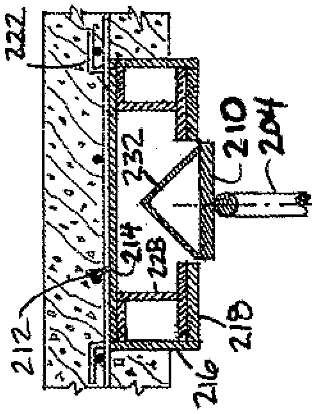
FIG. 47 is a sectional end view of the locking members of FIG. 46 shown in the open or unlocked position prior to receiving the flange of one of the truss members therein.
Figure 48:
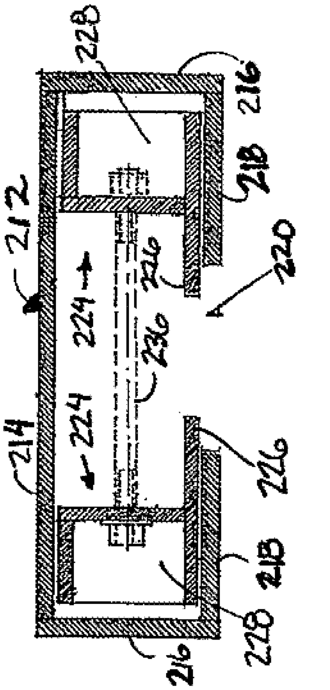
FIG. 48 is a sectional end view of the locking members according to the embodiment of either FIG. 44 or FIG. 46, shown retained in the locked position by locking fasteners at opposing ends of the locking members.

In an alternative embodiment as shown in FIGS. 46 and 47, the springs 230 may be omitted so that the locking members are instead manually displaced inwardly into the locked position subsequent to insertion of the flanges of the truss members into the channel members 212 respectively.

In either embodiment of the locking members 224, once the locked position has been reached, the locking members can be further retained in the locked position by a threaded locking fastener 236 or bolt which is secured between the body portions 228 of the two locking members of each channel. The locking members 224 typically comprise elongate profiles spanning the full height of the channel member across the full height of the resulting first shell 16. In this instance, two locking fasteners 236 can be secured between the two locking members by locating one of the locking fasteners at each of the two opposing ends of the locking members. In general, the idea is to use identical panels for slabs and walls.

Further, once the concrete is poured in plant formworks and is cured, the panels for the slabs are ready for transportation, while the rotating formwork is positioned above and on top of the static formwork at predetermined height dictated by the thickness of the wall.

FIGS. 12 to 17 presents the wall panel consisting of precast concrete shells and stiffeners—either cold formed channels or open web members (not shown). The wall shells are joined together with unique inserts. These inserts are placed in the interior space of the walls. The shape of the inserts varies depending on the section of the stiffeners—"C" or "H" or open web trusses (not shown). These inserts or connectors guarantee the position of the wall precast panels and the required resistance against hydrostatic pressure of the fresh concrete FIG. 18 presents the slab panel consisting of precast concrete shell and stiffeners. The required reinforcement of the concrete slab—precast shells and field concrete—is place inside of the precast shell.

Figure 22:
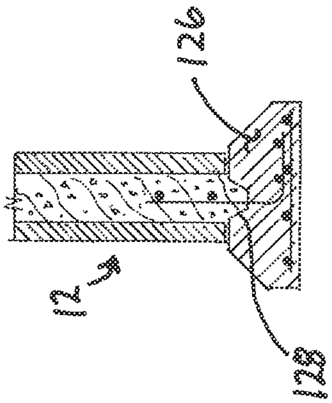
FIG. 22 is an elevational view of a wall assembly according to any embodiment in a mounted position on a footing member.
Figure 20:
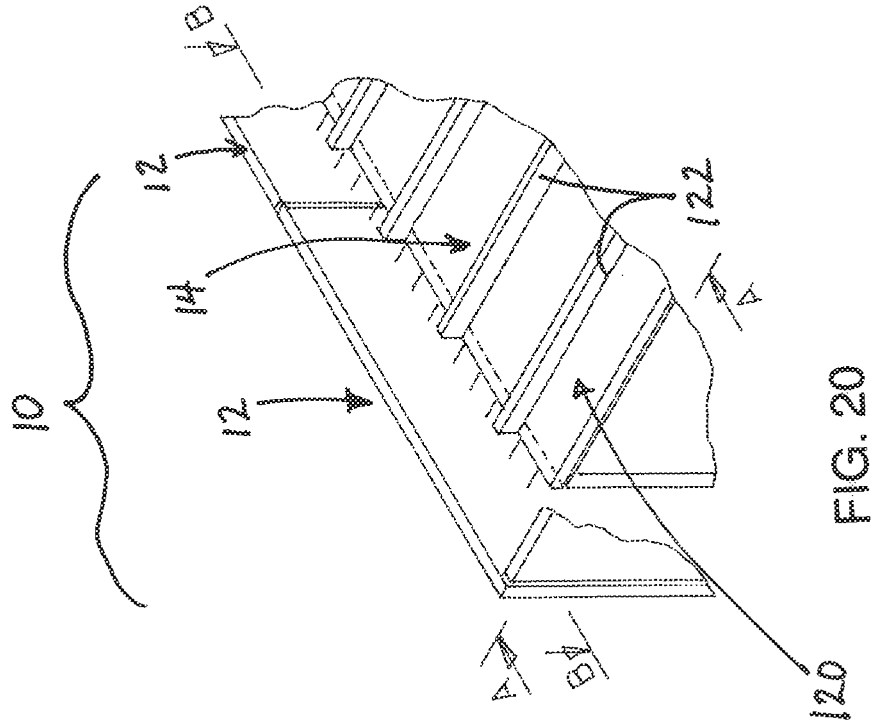
FIG. 20 is a perspective view of the bottom shell of the floor assembly according to the first embodiment of FIG. 18 in a mounted position on a plurality of wall assemblies.
Figure 25:
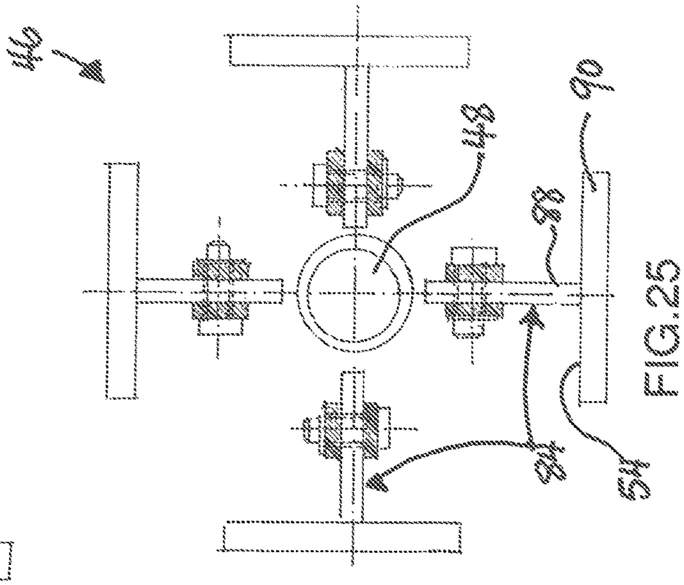
FIG. 25 is a horizontal cross sectional view of the receiver according to the first embodiment of FIG. 24 in an open position.
Figure 24:
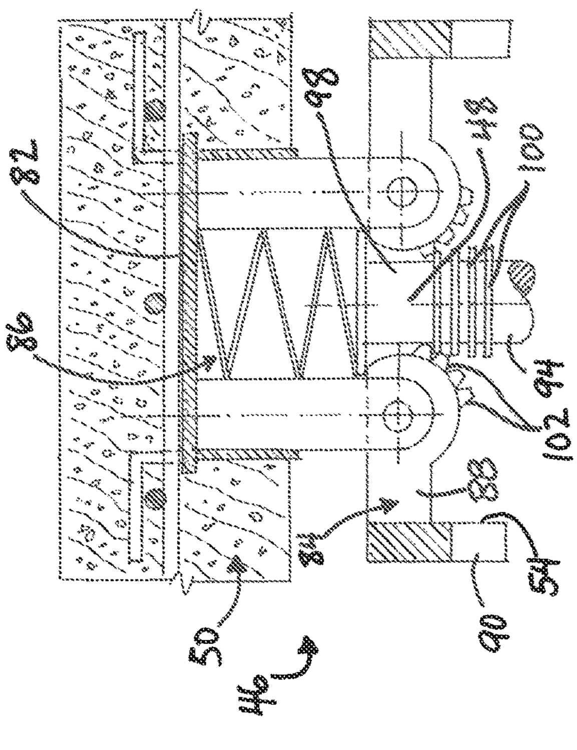
FIG. 24 is an elevational view of an individual mechanical coupling including a pin and mating receiver according to a first embodiment of the receiver in an open position.

FIGS. 20 to 22 shows the assembly consisting of wall and slab panels. The assembly is completed with vertical and horizontal sections showing the additional connecting reinforcement and the field placed concrete.

FIG. 37 shows schematic of the proposed technology to fabricate the wall and slab precast panels FIG. 38 shows schematic of the lifting of the wall panel being ready for removal of the formwork and subsequent storage or transportation to field.

FIGS. 24 to 34 show variants of pin/shaft and locker system used as stand alone or in combination with the above embodiments. This system provides connection between the two precast wall shells.

FIG. 1 through 11 are variants of inserts/connectors for the wall precast shells. The inserts/connectors are either open web trusses according to FIGS. 1 to 5 or full web "C" or "H" shapes according to FIGS. 6 to 11. The inserts/connectors are being placed after the precast shells are formed and differ from the system shown on FIGS. 12 to 17.

The system described herein provides a solution combining the advantages of both concepts described above and avoiding the deficiencies. Thus, the shells of the wall product are fabricated at once, then cure together and after curing is done, one of the shells—the right one in FIG. 37—rotates along the horizontal axes and is positioned on top of the bottom one—the left one in FIG. 37. At this point two things may happen—the shells are joined together with pin/shaft and locker devices according to FIGS. 24 through 36, or, by inserting connecting members as shown in FIGS. 1 to 17. The same hydraulic system is then used to lift the assembly vertically as shown in FIGS. 24 to 36. Afterwards the formwork is removed and the assembly is ready for transportation and installation. It is possible to further simplify the process by producing, transporting and installing the shells for the wall separately. Such process seems attractive and feasible, especially with the solution shown in FIGS. 12 to 17, where the panels are having enough rigidity by providing them with separate stiffeners.

The floor slabs are typically produced in the same form work as the wall shells. Thus, the system provides great flexibility as production of variety of panels is not limited by the number of formwork for walls and slabs separately.

The joining of the wall shells is solved by two different concepts—the inserts as shown in FIGS. 1 to 17 and the pin/shaft and lockers as shown in FIGS. 24 to 36. Both systems could be used separately or together. In the case of latter, pin/shafts and lockers could be positioned at the upper corners and be used as lifting devices instead of separated lifting lugs.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A building system for a building structure, the building system comprising:

at least one wall assembly including a mold cavity arranged to receive poured concrete therein, the at least one wall assembly comprising:

(i) an inner shell including (a) a panel of concrete having a first side defining an inner surface of the at least one wall assembly and a second side at an interior of the at least one wall assembly and (b) a plurality of stiffener members embedded in the panel of concrete so as to be at least partly exposed at the second side of the panel of concrete such that the plurality of stiffener members of the inner shell protrude from the second side of the panel of the inner shell into the mold cavity;

(ii) an outer shell including (a) a panel of concrete having a first side defining an exterior surface of the at least one wall assembly and a second side at an interior of the at least one wall assembly and (b) a plurality of stiffener members embedded in the panel of concrete so as to be at least partly exposed at the second side of the panel of concrete such that the plurality of stiffener members of the outer shell protrude from the second side of the panel of the outer shell into the mold cavity; and (iii) a mechanical coupling connected between the plurality of stiffener members of the inner shell and the plurality of stiffener members of the outer shell such that (a) said mold cavity is defined between the second side of the inner shell and the second side of the outer shell, (b) the mechanical coupling within the mold cavity supports the inner shell and the outer shell at a fixed spacing such that the inner and outer shells are immovable relative to one another, and (c) the at least one wall assembly is able to be transported in an assembled form to a location of the building structure from a separate manufacturing location prior to receiving the poured concrete therein;

wherein the stiffener members of the inner shell and the outer shell comprise elongate metal channels that are parallel and spaced apart from one another across a width of the respective panel of concrete.

2. A building system for a building structure, the building system comprising:

at least one wall assembly including a mold cavity arranged to receive poured concrete therein, the at least one wall assembly comprising:

(i) an inner shell including (a) a panel of concrete having a first side defining an inner surface of the at least one wall assembly and a second side at an interior of the at least one wall assembly and (b) a plurality of stiffener members embedded in the panel of concrete so as to be at least partly exposed at the second side of the panel of concrete such that the plurality of stiffener members of the inner shell protrude from the second side of the panel of the inner shell into the mold cavity;

(ii) an outer shell including (a) a panel of concrete having a first side defining an exterior surface of the at least one wall assembly and a second side at an interior of the at least one wall assembly and (b) a plurality of stiffener members embedded in the panel of concrete so as to be at least partly exposed at the second side of the panel of concrete such that the plurality of stiffener members of the outer shell protrude from the second side of the panel of the outer shell into the mold cavity; and (iii) a mechanical coupling connected between the plurality of stiffener members of the inner shell and the plurality of stiffener members of the outer shell such that (a) said mold cavity is defined between the second side of the inner shell and the second side of the outer shell, (b) the mechanical coupling within the mold cavity supports the inner shell and the outer shell at a fixed spacing such that the inner and outer shells are immovable relative to one another, and (c) the at least one wall assembly is able to be transported in an assembled form to a location of the building structure from a separate manufacturing location prior to receiving the poured concrete therein;

wherein the stiffener members span a height of the mold cavity of the at least one wall assembly.

3. The building system according to claim 1 wherein the panel of concrete of the outer shell is wider than the panel of concrete of the inner shell by a lateral distance corresponding to a thickness of the at least one wall assembly such that the mold cavity of the at least one wall assembly is arranged to communicate openly with the mold cavity of an adjacent assembly of identical configuration that is supported perpendicularly to the at least one wall assembly in forming an outside corner of the building structure.

4. The building system according to claim 1 wherein the inner shell is arranged to support an end of a floor assembly therein defining a lower boundary of a floor cavity arranged to receive poured concrete forming a floor thereon, the panel of concrete of the outer shell of the at least one wall assembly being taller than the panel of concrete of the inner shell by a protruding height corresponding to a thickness of the floor such that the mold cavity of the at least one wall assembly is arranged to communicate openly with the floor cavity of the floor assembly.

5. The building system according to claim 4 in combination with the floor assembly, wherein the floor assembly comprises a bottom shell defining the lower boundary of the floor cavity, the bottom shell including a panel of concrete and a plurality of stiffener members partly embedded in the panel of concrete to protrude upwardly from an upper surface of the panel of concrete.

6. The building system according to claim 5 wherein the bottom shell of the floor assembly is identical to one of the inner shell or the outer shell of the at least one wall assembly.

7. A building system for a building structure, the building system comprising:

at least one wall assembly including a mold cavity arranged to receive poured concrete therein, the at least one wall assembly comprising:

(i) an inner shell including (a) a panel of concrete having a first side defining an inner surface of the at least one wall assembly and a second side at an interior of the at least one wall assembly and (b) a plurality of stiffener members embedded in the panel of concrete so as to be at least partly exposed at the second side of the panel of concrete such that the plurality of stiffener members of the inner shell protrude from the second side of the panel of the inner shell into the mold cavity;

(ii) an outer shell including (a) a panel of concrete having a first side defining an exterior surface of the at least one wall assembly and a second side at an interior of the at least one wall assembly and (b) a plurality of stiffener members embedded in the panel of concrete so as to be at least partly exposed at the second side of the panel of concrete such that the plurality of stiffener members of the outer shell protrude from the second side of the panel of the outer shell into the mold cavity; and (iii) a mechanical coupling connected between the plurality of stiffener members of the inner shell and the plurality of stiffener members of the outer shell such that (a) said mold cavity is defined between the second side of the inner shell and the second side of the outer shell, (b) the mechanical coupling within the mold cavity supports the inner shell and the outer shell at a fixed spacing such that the inner and outer shells are immovable relative to one another, and (c) the at least one wall assembly is able to be transported in an assembled form to a location of the building structure from a separate manufacturing location prior to receiving the poured concrete therein;

wherein the mechanical coupling comprises a plurality of mating profiles arranged to be coupled between the stiffener members of the inner and outer shells by longitudinal sliding connections oriented in a direction of a height of the at least one wall assembly.

8. The building system according to claim 1 wherein the stiffener members of the inner shell are connected to corresponding ones of the stiffener members of the outer shell by respective truss members spanning a height of the mold cavity of the at least one wall assembly.

9. The building system according to claim 7 wherein the inner end of each stiffener member of the inner shell is joined in proximity to the inner end of a corresponding one of the stiffener members of the outer shell by one or more connectors defining said mechanical coupling and defining said plurality of mating profiles arranged to be coupled between the stiffener members of the inner and outer shells by said longitudinal sliding connections.

10. A building system for a building structure, the system comprising:

at least one wall assembly comprising:

(i) an inner shell including (a) a panel of concrete having a first side defining an inner surface of the wall assembly and a second side at an interior of the wall assembly and (b) a plurality of stiffener members embedded in the panel of concrete so as to be at least partly exposed at the second side of the panel of concrete;

(ii) an outer shell including (a) a panel of concrete having a first side defining an exterior surface of the wall assembly and a second side at an interior of the wall assembly and (b) a plurality of stiffener members embedded in the panel of concrete so as to be at least partly exposed at the second side of the panel of concrete; and (iii) a mechanical coupling arranged to be connected between the inner and outer shells so as to define a mold cavity between the second sides of the inner and outer shells arranged to receive poured concrete therein;

wherein the mechanical coupling comprises a plurality of coupling pins at least partly embedded within a first shell among the inner and outer shells and a plurality of receivers at least partly embedded within a second shell among the inner and outer shells, the coupling pins being arranged to mate with the receivers in a manner that retains the coupling pins within the receivers when the coupling pins are inserted into the receivers along an axis oriented perpendicularly to the inner and outer shells.

11. The building system according to claim 10 wherein the coupling pins are spaced apart across the first shell in a grid pattern.

12. The building system according to claim 1 further comprising a layer of insulating material spanning the second side of one of the inner shell or the outer shell within the mold cavity.

13. A building system for a building structure, the building system comprising:

at least one wall assembly including a mold cavity arranged to receive poured concrete therein, the at least one wall assembly comprising:

(i) an inner shell including (a) a panel of concrete having a first side defining an inner surface of the at least one wall assembly and a second side at an interior of the at least one wall assembly and (b) a plurality of stiffener members embedded in the panel of concrete so as to be at least partly exposed at the second side of the panel of concrete such that the plurality of stiffener members of the inner shell protrude from the second side of the panel of the inner shell into the mold cavity;

(ii) an outer shell including (a) a panel of concrete having a first side defining an exterior surface of the at least one wall assembly and a second side at an interior of the at least one wall assembly and (b) a plurality of stiffener members embedded in the panel of concrete so as to be at least partly exposed at the second side of the panel of concrete such that the plurality of stiffener members of the outer shell protrude from the second side of the panel of the outer shell into the mold cavity; and (iii) a mechanical coupling connected between the plurality of stiffener members of the inner shell and the plurality of stiffener members of the outer shell such that (a) said mold cavity is defined between the second side of the inner shell and the second side of the outer shell, (b) the mechanical coupling within the mold cavity supports the inner shell and the outer shell at a fixed spacing such that the inner and outer shells are immovable relative to one another, and (c) the at least one wall assembly is able to be transported in an assembled form to a location of the building structure from a separate manufacturing location prior to receiving the poured concrete therein;

the stiffener members on a first shell among the inner shell and the outer shell comprising truss members arranged to span at least partway across the mold cavity between the panels of the concrete;

the stiffener members on a second shell among the inner shell and the outer shell comprising channel members arranged to receive respective portions of the truss members therein; and the mechanical coupling being arranged to retain said portions of the truss members within the channel members such that the inner and outer shell are held at a fixed spacing relative to one another.

14. The building system according to claim 13 wherein the stiffener members on the second shell are arranged to receive the respective portions of the truss members inserted therein in an insertion direction that is perpendicular to the panel of concrete of the second shell.

15. A method of forming a wall assembly for a building structure, the method comprising:

forming an inner shell using a first mold to cast a first panel of concrete having a first side at the bottom of the first mold, a second side at a top of the first mold, and a plurality of stiffener members embedded in the concrete so as to be at least partly exposed at the second side of the panel of concrete corresponding to the top of the first mold;

forming an outer shell using a second mold to cast a second panel of concrete having a first side at the bottom of the second mold, a second side at a top of the second mold, and a plurality of stiffener members embedded in the concrete so as to be at least partly exposed at the second side of the panel of concrete corresponding to the top of the second mold;

subsequent to forming and curing the inner shell and the outer shell, pivoting the inner shell and the outer shell 180 degrees relative to one another and using a mechanical coupling to mechanically couple the inner shell and the outer shell at a fixed spacing relative to one another so as to define a mold cavity between the second sides of the inner shell and the outer shell and such that the inner shell and the outer shell are immovable relative to one another;

transporting the assembled wall assembly comprising the inner shell and the outer shell, while the inner shell and the outer shell are mechanically coupled immovably relative to one another by the mechanical coupling from a manufacturing location to a separate building location; and casting field concrete into the mold cavity between the inner and outer shells after transporting the assembled wall assembly from the manufacturing location to the building location.

16. The method according to claim 15 further comprising positioning the first mold and the second mold at a prescribed spacing relative to one another and mechanically coupling the inner shell and the outer shell while the inner shell and the outer shell remain supported within the first and second molds respectively such that a thickness of the mold cavity corresponds to said prescribed spacing.

17. The method according to claim 16 wherein the inner shell and the outer shell are pivoted 180 degrees relative to one another by coupling the first mold and the second mold relative to one another and pivoting the first mold and the second mold relative to one another until the inner shell and the outer shell are positioned at said prescribed spacing prior to mechanically coupling the inner shell to the outer shell.

18. The method according to claim 16 further comprising displacing the first mold and the second mold into a vertical orientation prior to releasing the inner and outer shells from the first and second molds.

19. The method according to claim 15 further comprising:

providing a supporting frame coupling the first mold and the second mold relative to one another such that the first mold and the second mold frame are pivotal 180 degrees relative to another from a molding orientation to a mounting orientation of the first mold and the second mold;

forming the inner shell and the outer shell by simultaneously casting the first panel of concrete within the first mold and the panel of concrete within the second mold in the molding orientation of the first mold and the second mold; and subsequent to curing the inner shell and the outer shell, pivoting the inner shell and the outer shell 180 degrees relative to one another by operating the supporting frame to pivot the first mold 180 relative to the second mold from the molding orientation to the mounting orientation of the first mold and the second mold.

* * * * *